US011905307B2

(12) United States Patent
Baumgartner et al.

(10) Patent No.: US 11,905,307 B2
(45) Date of Patent: Feb. 20, 2024

(54) PHOSPHAVIOLOGEN DERIVATIVES, METHODS OF MAKING THE SAME, AND USES THEREOF

(71) Applicants: Thomas Baumgartner, Toronto (CA); Markus Boergardts, Duisburg (DE)

(72) Inventors: Thomas Baumgartner, Toronto (CA); Markus Boergardts, Duisburg (DE)

(73) Assignees: Thomas Baumgartner, Toronto (CA); Markus Borgardts, Duisburg (DE)

( * ) Notice: Subject to any disclaimer, the term of this patent is extended or adjusted under 35 U.S.C. 154(b) by 752 days.

(21) Appl. No.: 16/979,433

(22) PCT Filed: Mar. 22, 2019

(86) PCT No.: PCT/CA2019/050354
§ 371 (c)(1),
(2) Date: Sep. 9, 2020

(87) PCT Pub. No.: WO2019/183716
PCT Pub. Date: Oct. 3, 2019

(65) Prior Publication Data
US 2021/0002310 A1    Jan. 7, 2021

Related U.S. Application Data

(60) Provisional application No. 62/648,010, filed on Mar. 26, 2018.

(51) Int. Cl.
| | |
|---|---|
| *C07F 9/6568* | (2006.01) |
| *C09K 9/02* | (2006.01) |
| *G02F 1/1516* | (2019.01) |
| *H01M 10/0567* | (2010.01) |
| *H01M 4/62* | (2006.01) |
| *G02F 1/1514* | (2019.01) |

(52) U.S. Cl.
CPC ............ *C07F 9/65683* (2013.01); *C09K 9/02* (2013.01); *G02F 1/1516* (2019.01); *H01M 4/62* (2013.01); *H01M 10/0567* (2013.01); *C09K 2211/1018* (2013.01); *G02F 2001/15145* (2019.01); *H01M 2300/0025* (2013.01)

(58) Field of Classification Search
CPC ............. C07F 9/65683; C07F 9/65685; C07F 9/65688; C07F 9/6584; C09K 9/02; C09K 2211/1018; H01M 4/62; H01M 10/0567; H01M 2300/0025; G02F 1/1503; G02F 1/1516; G02F 2001/15145; Y02E 60/10
See application file for complete search history.

(56) References Cited

U.S. PATENT DOCUMENTS

| | | | |
|---|---|---|---|
| 6,067,184 A | 5/2000 | Bonhôte et al. | |
| 6,426,827 B1 | 7/2002 | Bonhôte et al. | |
| 6,734,305 B2 | 5/2004 | Poerre et al. | |
| 2018/0026297 A1 | 1/2018 | Odom et al. | |

OTHER PUBLICATIONS

Baumgartner, T. (2014) Insights on the Design and Electron-Acceptor Properties of Conjugated Organophosphorus Materials, Acc. Chem. Res., 2014, 47, 1613-1622.
Baumgartner, T., and Reáu, R. (2006) Organophosphorus π-Conjugated Materials, Chem. Rev., 2006, 106, 4681-4727.
Baumgartner, T., (2017) Strongly Electron-Accepting, Phosphrous-Bridged Viologens: From Synthesis to Applications, presentation Sep. 7, 2017, Department of Chemistry at the University of Toronto, Toronto, Ontario, Canada.
Decken, A. et al (2001) Synthesis and Characterization of Manganese Complexes of the Dibenzophospholyl Ligand, Canadian Journal of Chemistry, 2001, 79, 1321-1329.
Durben, S. and Baumgartner, T. (2011) 3,7-Diazadibenzophosphole Oxide—A Phosphorus-Bridged Viologen-Analogue with Significantly Lowered Reduction Threshold, Angew. Chem. Int. Ed., 2011, 50, 7948-7952.
Durben, S. and Baumgartner, T. (2011) Azadibenzophospholes: Functional Building Blocks with Pronounced Electron-Acceptor Character, Inorg. Chem., 2011, 50, 6823-6836.
Engl, P.S. et al., (2015) Synthesis and Characterization of N-Trifluoromethyl N-Heterocyclic Carbene Ligands and Their Complexes, Organometallics. 2015, 34, 1384-1395.
Fave C. et al., (2004) Connecting π-Chromophrous by σ-P-P Bonds: New Type of Assemblies Exhibiting σ-π-Conjugation, J. Am. Chem. Soc., 2004, 126, 6058-6063.
He, X and Baumgartner, T., (2013) Conjugated Main-Group Polymers for Optoelecctronics, RSC Adv., 2013, 3, 11334-11350.
He, X. et al., (2014) Synthesis and Properties of Cholesteric Click-Phospholes, Org. Lett., 2014, 16, 1366-1369.
Nakahara, K., Oyaizu, K., and Nishide, H., (2011), Organic Radical Battery Approaching Practical Use, Chem. Lett., 2011, 40, 222-227.
Nyulászi, L. (2001) Aromaticity of Phosphorus Heterocycles, Chem. Rev., 2001, 101, 1229-1246.
Landi, B.J. et al., (2009) Carbon Nanotubes for Lithium Ion Batteries, Energy Environ. Sci., 2009, 2, 638-654.
Lv, T. et al., (2013) Copper-Catalyzed Direct Aryl Quaternization of N-Substituted Imidazoles to Form Imidazolium Salts, Org. Chem, 2013, 78, 5723-5730.
Pearson, R. G., (1968) Hard and Soft Acids and Bases, HSAB, Part I, J. Chem. Educ., 1968, 45, 581-587.
Pearson, R. G., (1968) Hard and Soft Acids and Bases, HSAB, Part II, J. Chem. Educ., 1968, 45, 643-648.
Ren, Y. and Baumgartner, T., (2012) Combining Form with Function—The Dawn of Phosphole-Based Functional Materials, Dalton. Trans, 2012, 41, 7792-7800.

(Continued)

*Primary Examiner* — Jack Dinh
(74) *Attorney, Agent, or Firm* — Thomas | Horstemeyer, LLC

(57) ABSTRACT

The present invention relates to new phosphaviologen derivatives, methods of making phosphaviologen derivatives, and uses thereof, including uses in electrochromic devices and organic battery materials. The phosphaviologen derivatives described herein have strong electron-accepting properties and can be used to provide phosphaviologen derivative-containing electronic materials. In certain embodiments, the phosphaviologen derivatives include dimeric phosphaviologens.

38 Claims, 4 Drawing Sheets

(56) References Cited

OTHER PUBLICATIONS

Ren, Y. et al., (2011) External-Stimuli Responsive Photophysics and Liquid Crystal Properties of Self-Assembled "Phosphole-Lipids", J. Am. Chem. Soc., 2011, 133, 42, 17014-17026.

Ren, Y. et al., (2012) Bio-Inspired Phosphole-Lipids: From Highly Fluorescent Organogels to Mechanically Responsive FRET, Angew Chem. Int. Ed., 2012, 51, 3964-3968.

Reus, C.; Stolar, M.; Vanderkley, J.; Nebauer, J. and Baumgartner, T. (2015) A Convenient N-Arylation Route for Electron-Deficient Pyridines: The Case of π-Extended Electrochromic Phosphaviologens, J. Am. Chem. Soc., 2015, 137, 11710-11717.

Romero-Nieto, C. and Baumgartner, T. (2013) Ditheno [3,2-b:2',3'-d]phospholes: A Look Back at the First Decade, SynLett., 2013, 24, 920-937.

Romero-Nieto, C. et al., (2009) Simple and Efficient Generation of White Light Emission From Organophosphrous Building Blocks, Adv. Funct. Mater., 2009, 19, 3625-3631.

Stolar, M., Borau-Garcia, J., Toonen, M. and Baumgartner, T. (2015) Synthesis and Tunability of Highly Electron-Accepting, N-Benzylated "Phosphaviologens", J. Am. Chem. Soc., 2015, 137, 3366-3371.

Stolar, M.; Reus, C. and Baumgartner, T. (2016) Xylene-Bridged Phosphaviologen Oligomers and Polymers as High-Performance Electrode-Modifiers for Li-Ion Batteries, Adv. Energy Mater., 2016, 6, 1600944 (1 to 9).

Wang, Z. and Baumgartner, T. (2016) Synthesis and Optoelectronic Properties of P-P Bridged Dithieno[3,2-b:2',3'-d]phosphole Dimers, Presentation Jun. 9, 2016, Canadian Chemistry Conference and Exhibition (CSC 2016).

Quin, L. D., A Guide to Organophosphorus Chemistry. Wiley: 2000, 57-61 and 88-92.

PHOSPHAVIOLOGEN DERIVATIVES, METHODS OF MAKING THE SAME, AND USES THEREOF

CROSS-REFERENCE TO RELATED APPLICATIONS

This application is a 35 U.S.C. § 371 national stage application of PCT Application No. PCT/CA2019/050354, filed Mar. 22, 2019, which claims the benefit of and priority to U.S. Provisional Patent Application No. 62/648,010, filed Mar. 26, 2018, the contents of which are incorporated by reference herein in their entireties.

FIELD

The present invention relates to new phosphaviologen derivatives, methods of making phosphaviologen derivatives, and uses thereof, including uses in electrochromic devices and organic battery materials.

BACKGROUND

The exponential growth of organic electronics has fueled the search for new and improved molecular building blocks ever since its inception.

There is a growing need for lightweight and flexible electronics. Organic materials are known for their lightweight options, flexibility, and solution processability. Recently, organic redox-active materials have surfaced as both anode and cathode enhancers or replacements in the context of battery applications. In conventional lithium-ion batteries (LIBs), the kinetics are primarily dominated by the de-/re-intercalation on Li ions within the electrode materials, while in organic-based batteries this kinetic drawback is alleviated by utilizing the redox states of the organic materials resulting in electron migration. Cathodic materials commonly consist of p-type or electron-donating materials, which have been well researched and include, but are not limited to, polyacetylenes, organosulfur compounds, paraquinones, tetracyanoquinodimethane, and polypyrrole composites. While anode (n-type or electron-accepting) materials are far more rare in the field of organic batteries, one class of compounds have appeared as potential candidates to develop fully organic and flexible, lightweight batteries: compounds based on quaternized pyridine moieties, such as viologens (quaternized 4,4'-bipyridiniums). Viologens are known to exhibit rapid and reversible electron transfers giving them potential for use in a variety of applications such as, redox mediators, electrochromic devices, and now as electrode materials for organic batteries. A need exists for the development of new viologen derivatives for use in a variety of such applications.

SUMMARY

In an aspect, there is provided a compound having the structure of Formula I:

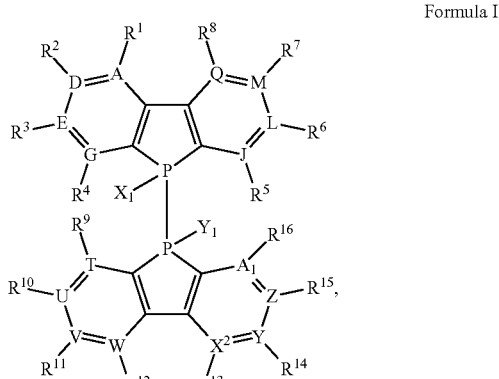

Formula I a salt, hydrate, solvate, tautomer, optical isomer, or combination thereof;
wherein:
  A, D, E, G, J, L, M, Q, T, U, V, W, $X^2$, Y, Z, and $A_1$ are each independently selected from C or N;
  $R^1$ to $R^{16}$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic, and when any one of $R^1$ to $R^{16}$ is bonded to N, $R^1$ to $R^{16}$ is optionally, a pair of electrons; and
  $X_1$ and $Y_1$ are each independently selected from a pair of electrons, O, S, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, a substituted or unsubstituted heteroaromatic, or $BR_1R_2R_3$, wherein $R_1$ to $R_3$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic.

In another aspect, wherein one or two of A, D, E, and G are N; one or two of J, L, M, and Q are N; one or two of T, U, V, and W are N; and/or one or two of, $X^2$, Y, Z, and $A_1$ are N. In another aspect, wherein one of A, D, E, and G are N; one or two of J, L, M, and Q are N; one or two of T, U, V, and W are N; and/or one or two of, $X^2$, Y, Z, and $A_1$ are N. In another aspect, wherein one of A, D, E, and G are N; one of J, L, M, and Q are N; one or two of T, U, V, and W are N; and/or one or two of, $X^2$, Y, Z, and $A_1$ are N. In another aspect, wherein one of A, D, E, and G are N; one of J, L, M, and Q are N; one of T, U, V, and W is N; and/or one or two of, $X^2$, Y, Z, and $A_1$ are N. In another aspect, wherein one of A, D, E, and G is N; one of J, L, M, and Q is N; one of T, U, V, and W is N; and/or one of, $X^2$, Y, Z, and $A_1$ is N. In another aspect, wherein at least one of E, L, U, and Z is N and A, D, G, J, M, Q, T, V, W, $X^2$, Y, and $A_1$ are each C. In another aspect, wherein at least one of D, M, V, and Y is N and A, E, G, J, L, Q, T, U, W, $X^2$, Z, and $A_1$ are each C. In another aspect, wherein at least one of A, Q, W, and $X^2$ is N and D, E, G, J, L, M, T, U, V, Y, Z, and $A_1$ are each C. In another aspect, wherein at least one of G, J, T, and $A_1$ is N and A, D, E, L, M, Q, U, V, W, $X^2$, Y, and Z are each C. In another aspect, wherein $R^1$ to $R^{16}$ and $R_1$ to $R_3$ are each independently selected from H, a halo group, a hydroxyl group, a substituted or unsubstituted alkyl group, a substituted or unsubstituted alkenyl group, a substituted or unsubstituted alkynyl group, a substituted or unsubstituted aromatic group, a substituted or unsubstituted heteroaromatic group, a substituted or unsubstituted carbocyclic group, a substituted or unsubstituted heterocyclic group, or when $R^1$ to $R^{16}$ is bonded to N, any one of $R^1$ to $R^{16}$ is optionally, a pair of electrons. In another aspect, wherein $R^1$ to $R^{16}$ and $R_1$ to $R_3$ are each independently selected from H, a substituted or unsubstituted alkyl group, a substituted or unsubstituted alkenyl group, a substituted or unsubstituted aromatic group, a substituted or unsubstituted heteroaromatic group, or when $R^1$ to $R^{16}$ is bonded to N, any one of $R^1$ to $R^{16}$ is optionally, a pair of electrons. In another aspect, wherein $R^1$ to $R^{16}$ and $R_1$ to $R_3$ are each independently selected from H, a substituted or unsubstituted $C_1$-$C_6$ alkyl group, a substituted or unsubstituted $C_2$-$C_6$ alkenyl group, a substituted or unsubstituted alkylaryl group, a substituted or unsubstituted alkylheteroaryl group, a substituted or unsubstituted aryl group, a substituted or unsubstituted heteroaryl group, or when $R^1$ to $R^{16}$ is bonded to N, any one of $R^1$ to $R^{16}$ is optionally, a pair of electrons. In another aspect, wherein $R^1$ to $R^{16}$ and $R_1$ to $R_3$ are each independently selected from H, a substituted or unsubstituted $C_1$-$C_6$ alkyl group, substituted or unsubstituted benzyl group, a substituted or unsubstituted aryl group, or when $R^1$ to $R^{16}$ is bonded to N, any one of $R^1$ to $R^{16}$ is optionally, a pair of electrons. In another aspect, wherein $R^1$ to $R^{16}$ and $R_1$ to $R_3$ are each independently selected from H, a $C_1$-$C_6$ alkyl group, a benzyl group, an aryl group, or when $R^1$ to $R^{16}$ is bonded to N, any one of $R^1$ to $R^{16}$ is optionally, a pair of electrons. In another aspect, wherein one or two of $R^1$ to $R^4$ are selected from a substituted or unsubstituted $C_1$-$C_6$ alkyl group, substituted or unsubstituted benzyl group, or a substituted or unsubstituted aryl group; one or two of $R^5$ to $R^8$ are selected from a substituted or unsubstituted $C_1$-$C_6$ alkyl group, substituted or unsubstituted benzyl group, or a substituted or unsubstituted aryl group; one or two of $R^9$ to $R^{12}$ are selected from a substituted or unsubstituted $C_1$-$C_6$ alkyl group, substituted or unsubstituted benzyl group, or a substituted or unsubstituted aryl group; and/or one or two of $R^{13}$ to $R^{16}$ are selected from a substituted or unsubstituted $C_1$-$C_6$ alkyl group, substituted or unsubstituted benzyl group, or a substituted or unsubstituted aryl group; and the remaining R groups are H or an alkyl group. In another aspect, wherein one of $R^1$ to $R^4$ is selected from a substituted or unsubstituted $C_1$-$C_6$ alkyl group, substituted or unsubstituted benzyl group, or a substituted or unsubstituted aryl group; one of $R^5$ to $R^8$ is selected from a substituted or unsubstituted $C_1$-$C_6$ alkyl group, substituted or unsubstituted benzyl group, or a substituted or unsubstituted aryl group; one of $R^9$ to $R^{12}$ is selected from a substituted or unsubstituted $C_1$-$C_6$ alkyl group, substituted or unsubstituted benzyl group, or a substituted or unsubstituted aryl group; and/or one of $R^{13}$ to $R^{16}$ is selected from a substituted or unsubstituted $C_1$-$C_6$ alkyl group, substituted or unsubstituted benzyl group, or a substituted or unsubstituted aryl group; and the remaining R groups are each independently selected from H or an alkyl group. In another aspect, wherein the alkyl group is a $C_1$-$C_6$ alkyl group. In another aspect, wherein the remaining R groups are H. In another aspect, wherein $X_1$ and $Y_1$ are each independently selected from a pair of electrons, O, S, a substituted or unsubstituted hydrocarbon group, or $BR_1R_2R_3$. In another aspect, wherein $X_1$ and $Y_1$ are each independently selected from a pair of electrons, O, S, a substituted or unsubstituted $C_1$-$C_6$ alkyl group, $BH_3$, or $BF_3$. In another aspect, wherein $X_1$ and $Y_1$ are each independently selected from a pair of electrons, O, or S. In another aspect, wherein $X_1$ and $Y_1$ are the same.

In another aspect, wherein the compound is selected from at least one of:

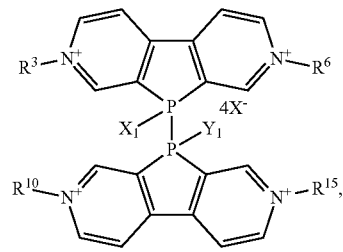

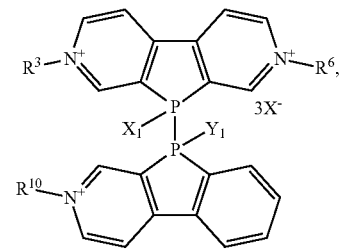

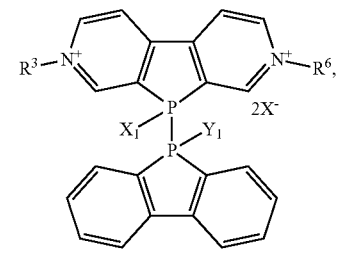

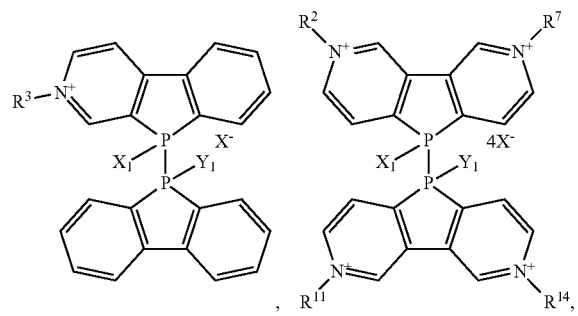

-continued
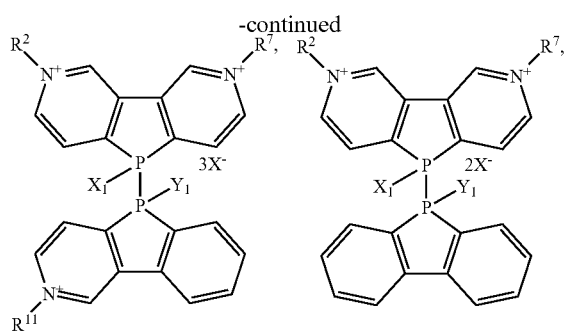
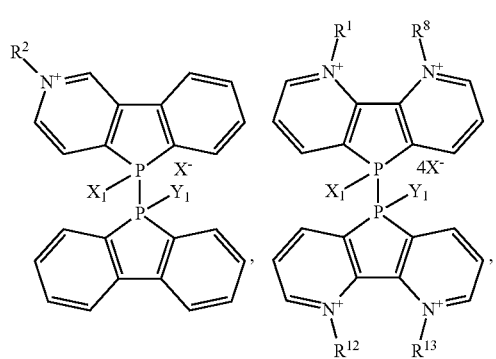
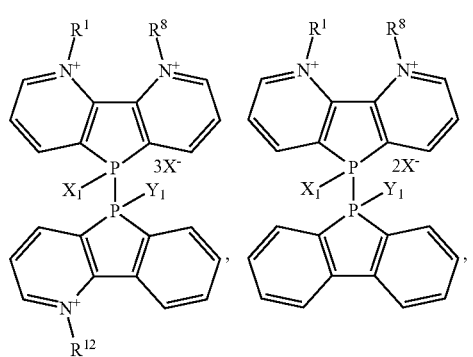
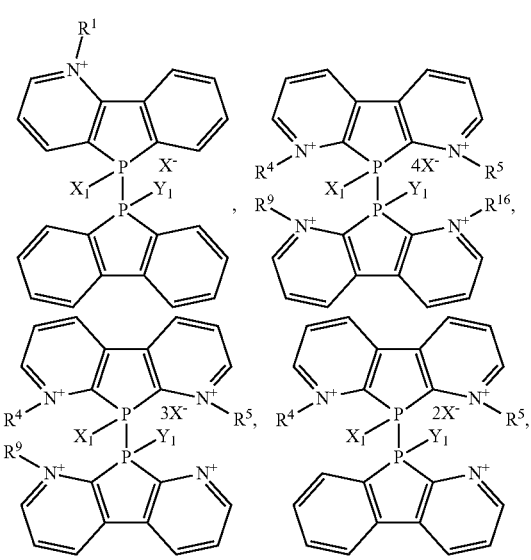
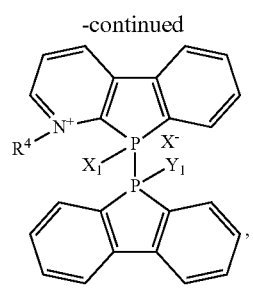
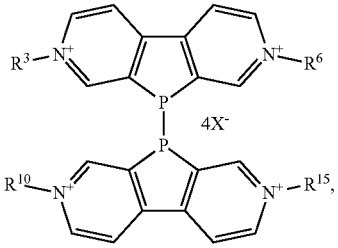
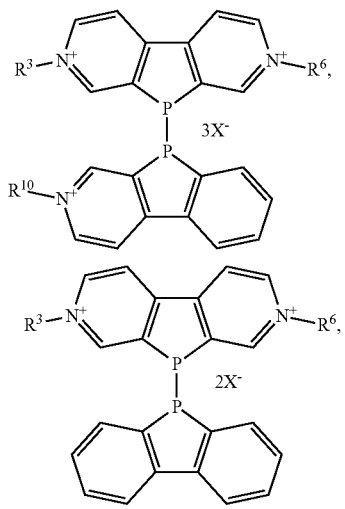
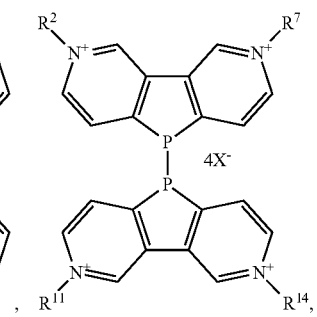
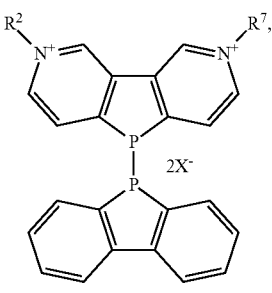

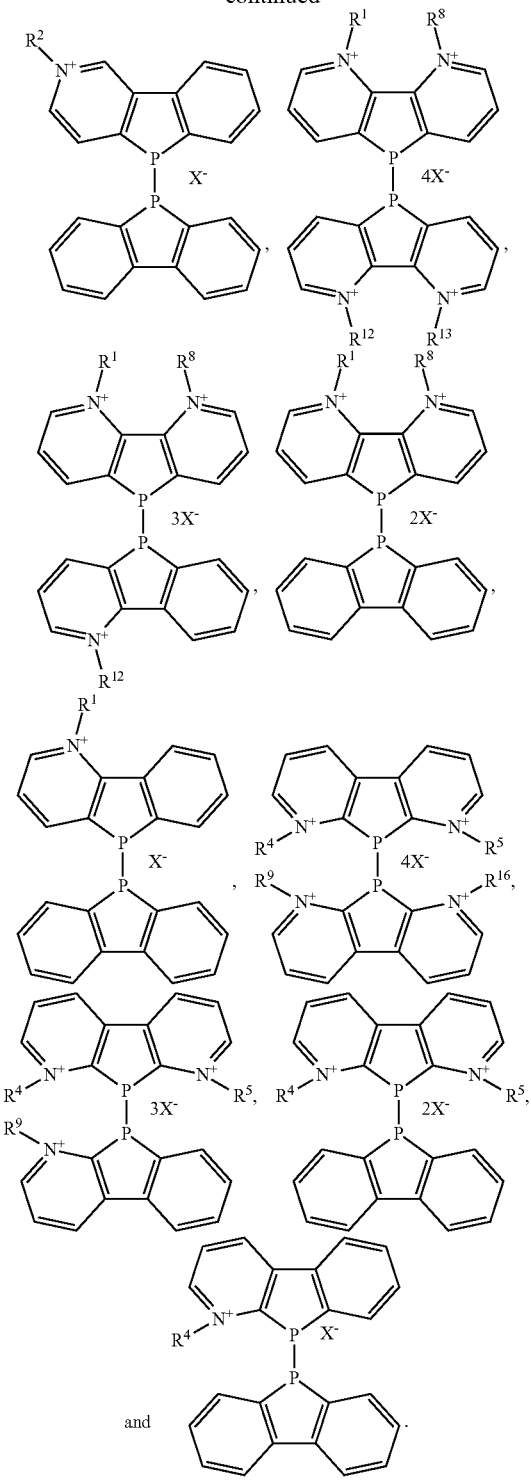

wherein X⁻ is selected from halide ions, $NO_3^-$, $ClO_4^-$, $OH^-$, $H_2PO_4^-$, $HSO_4^-$, $^-BF_4$, $^-PF_6$, sulfonate ions or carboxylate ions. In another aspect, wherein X⁻ is selected from Br⁻, $^-SO_3CF_3$, $^-BF_4$, or $^-PF_6$. In another aspect, wherein at least one of $R^3$, $R^6$, $R^{10}$, and $R^{15}$ is selected from a substituted or unsubstituted $C_1$-$C_6$ alkyl group, substituted or unsubstituted benzyl group, or a substituted or unsubstituted aryl group. In another aspect, wherein at least one of $R^3$, $R^6$, $R^{10}$, and $R^{15}$ is selected from methyl group, a substituted or unsubstituted benzyl group, or a substituted or unsubstituted aryl group. In another aspect, wherein at least one of $R^3$, $R^6$, $R^{10}$, and $R^{15}$ is selected from methyl group, a benzyl group, or an aryl group. In another aspect, wherein $R^3$, $R^6$, $R^{10}$, and $R^{15}$ are the same. In another aspect, wherein at least one of $R^2$, $R^7$, $R^{11}$, and $R^{14}$ is selected from a substituted or unsubstituted $C_1$-$C_6$ alkyl group, substituted or unsubstituted benzyl group, or a substituted or unsubstituted aryl group. In another aspect, wherein at least one of $R^2$, $R^7$, $R^{11}$, and $R^{14}$ is selected from methyl group, a substituted or unsubstituted benzyl group, or a substituted or unsubstituted aryl group. In another aspect, wherein at least one of $R^2$, $R^7$, $R^{11}$, and $R^{14}$ is selected from methyl group, a benzyl group, or an aryl group. In another aspect, wherein $R^2$, $R^7$, $R^{11}$, and $R^{14}$ are the same. In another aspect, wherein at least one of $R^1$, $R^8$, $R^{12}$, and $R^{13}$ is selected from a substituted or unsubstituted $C_1$-$C_6$ alkyl group, substituted or unsubstituted benzyl group, or a substituted or unsubstituted aryl group. In another aspect, wherein at least one of $R^1$, $R^8$, $R^{12}$, and $R^{13}$ is selected from methyl group, a substituted or unsubstituted benzyl group, or a substituted or unsubstituted aryl group. In another aspect, wherein at least one of $R^1$, $R^8$, $R^{12}$, and $R^{13}$ is selected from methyl group, a benzyl group, or an aryl group. In another aspect, wherein $R^1$, $R^8$, $R^{12}$, and $R^{13}$ are the same. In another aspect, wherein at least one of $R^4$, $R^5$, $R^9$, and $R^{16}$ is selected from a substituted or unsubstituted $C_1$-$C_6$ alkyl group, substituted or unsubstituted benzyl group, or a substituted or unsubstituted aryl group. In another aspect, wherein at least one of $R^4$, $R^5$, $R^9$, and $R^{16}$ is selected from methyl group, a substituted or unsubstituted benzyl group, or a substituted or unsubstituted aryl group. In another aspect, wherein at least one of $R^4$, $R^5$, $R^9$, and $R^{16}$ is selected from methyl group, a benzyl group, or an aryl group. In another aspect, wherein $R^4$, $R^5$, $R^9$, and $R^{16}$ are the same.

In another aspect, wherein the compound is selected from at least one of:

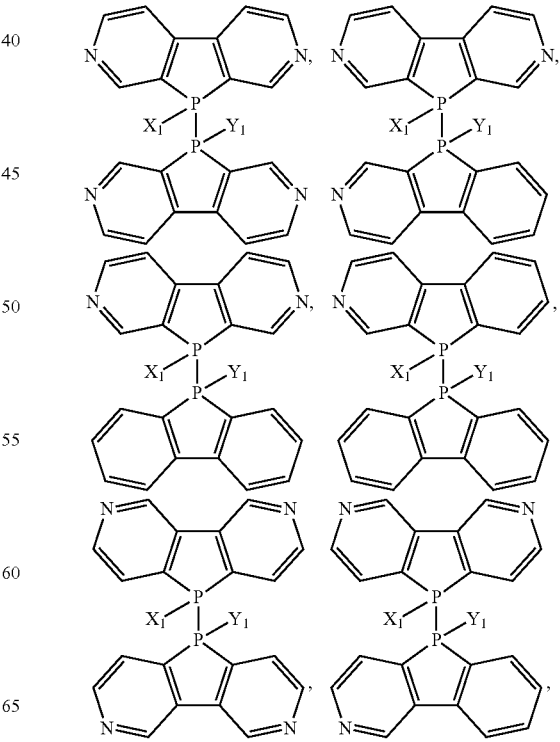

-continued
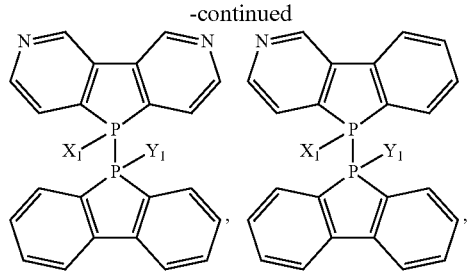
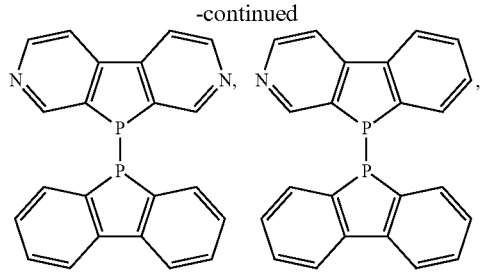
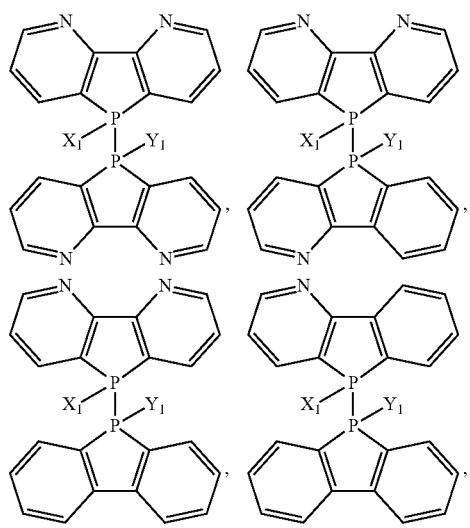
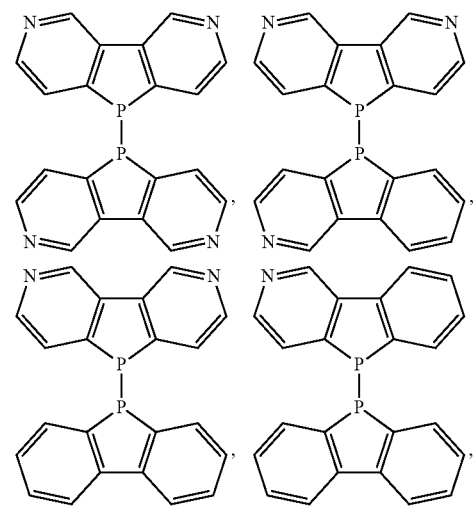
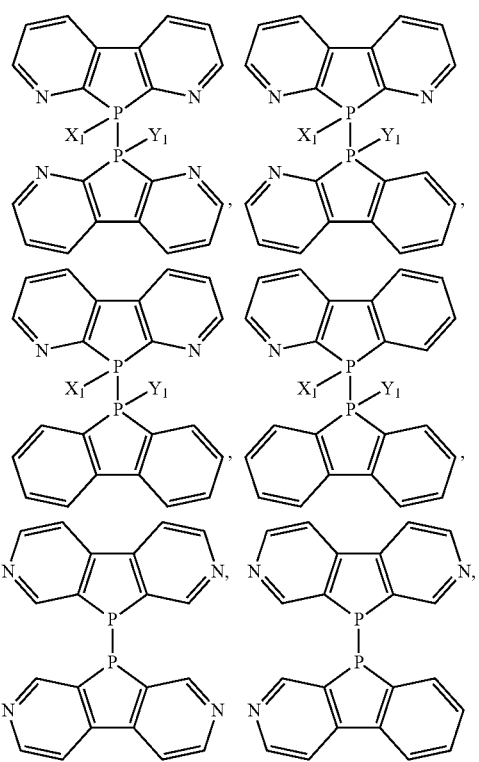
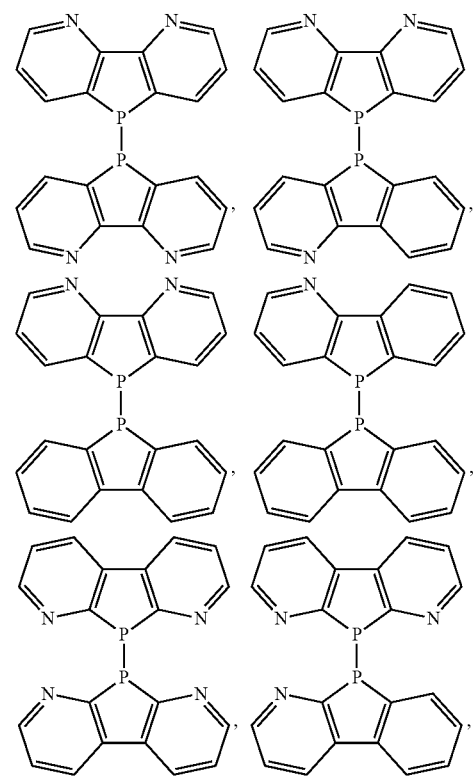

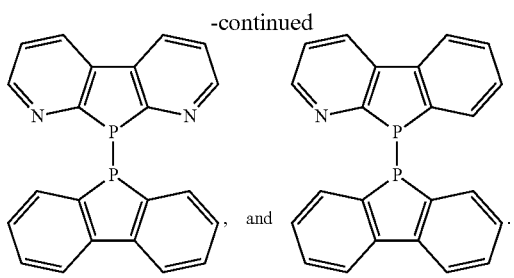

, and

In another aspect, wherein the compound has a P—P σ bond angled about 70° to about 90° to conjugated phosphole planes. In another aspect, wherein the compounds pack efficiently. In another aspect, wherein the compound described herein has up to five-color electrochromism.

In another aspect, there is provided a composition comprising at least one compound described herein. In another aspect, there is provided a redox mediator comprising at least one compound described herein. In another aspect, there is provided a redox mediator comprising the composition described herein. In another aspect, there is provided an electrochromic device comprising at least one compound described herein. In another aspect, there is provided an electrochromic device comprising the composition described herein. In another aspect, there is provided an electrode material comprising at least one compound described herein. In another aspect, there is provided an electrode material comprising the composition described herein. In another aspect, there is provided a battery comprising at least one compound described herein. In another aspect, there is provided a battery comprising the composition described herein. In another aspect, there is provided use of at least one of the compounds described herein in an electrochromic device. In another aspect, there is provided use of the composition described herein in an electrochromic device. In another aspect, there is provided use of at least one of the compounds described herein in an electrode material. In another aspect, there is provided use of the composition described herein in an electrode material. In another aspect, there is provided use of at least one of the compounds described herein in a battery. In another aspect, there is provided use of the composition described herein in a battery. In another aspect, there is provided a battery comprising: a negative electrode; a positive electrode; and an electrolyte comprising at least one compound described herein. In another aspect, wherein the battery is a rechargeable battery. In another aspect, wherein the electrolyte further comprises a charge-carrying medium. In another aspect, wherein the positive electrode is immersed in the electrolyte.

In another aspect, there is provided a battery comprising a passivating electrolyte additive, wherein the passivating electrolyte additive comprises at least one compound described herein. In another aspect, there is provided a battery comprising an electrode material, wherein the electrode material comprises at least one compound described herein.

In another aspect, there is provided an electrochromic device, comprising:
(a) at least one substantially transparent substrate having an electrically conductive material associated therewith; and
(b) an electrochromic medium which comprises:
(1) a solvent; and
(2) a cathodic material; and
(3) an anodic electrochromic material comprising at least one compound described herein.

In another aspect, wherein the solvent is selected from the group consisting of 3-methylsulfolane, sulfolane, glutaronitrile, dimethyl sulfoxide, dimethyl formamide, acetonitrile, polyethers including tetraglyme, alcohols including ethoxyethanol, nitrites including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. In another aspect, wherein the concentration of the anodic electrochromic material ranges from about 1 mM to about 500 mM. In another aspect, wherein the concentration of the anodic electrochromic material ranges from about 5 mM to about 50 mM.

In another aspect, there is provided an electrochromic medium for use in an electrochromic device, comprising:
(a) a solvent;
(b) a cathodic material; and
(c) an anodic electrochromic material comprising at least one compound described herein.

In another aspect, there is provided a method for making the compound described herein wherein the method comprises:
a) reacting a compound of Formula IA with a base and $(LG^3)P(NR_{17}R_{18})$ to form an intermediate of Formula IB:

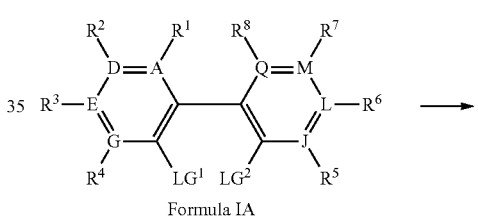

Formula IA

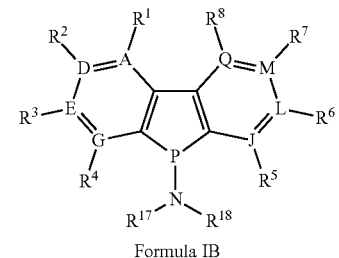

Formula IB wherein $LG^1$, $LG^2$ and $LG^3$ are each independently selected from a leaving group;
$R^{17}$ and $R^{18}$ are each independently selected from a substituted or unsubstituted hydrocarbyl group or $R^{17}$ and $R^{18}$ form a substituted or unsubstituted heterocycle with the N atom; and
when any of A, D, E, G, J, L, M and Q are N and any of $R^1$ to $R^8$ is bonded to N, $R^1$ to $R^8$ is a pair of electrons;
b) reacting the intermediate of Formula IB with a hard Lewis acid to form Formula IC

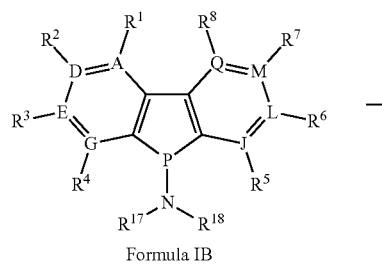

Formula IB

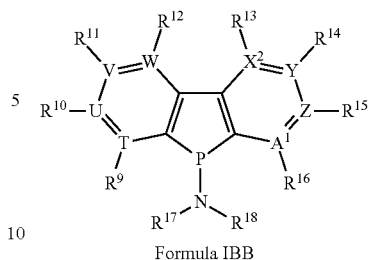

Formula IBB

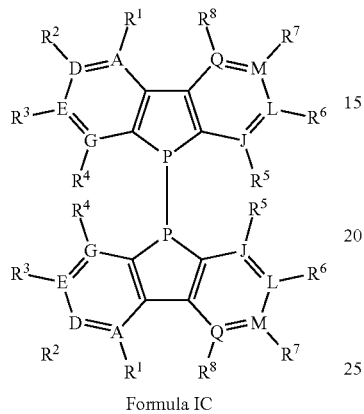

Formula IC

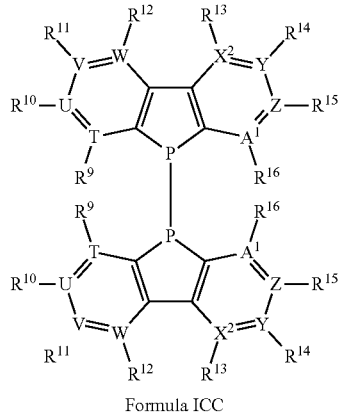

Formula ICC

In another aspect, there is provided a method for making the compound described herein, wherein the method comprises:

a) reacting a compound of Formula IAA with a base and $(LG^3)P(NR_{17}R_{18})$ to form an intermediate of Formula IBB:

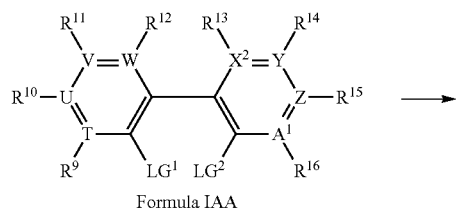

Formula IAA

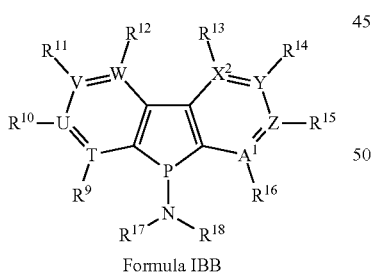

Formula IBB wherein $LG^1$, $LG^2$ and $LG^3$ are each independently selected from a leaving group;

$R^{17}$ and $R^{18}$ are each independently selected from a substituted or unsubstituted hydrocarbyl group or $R^{17}$ and $R^{18}$ form a substituted or unsubstituted heterocycle with the N atom; and when any of T, U, V, W, $A^1$, Z, Y, $X^2$ are N and any of $R^9$ to $R^{16}$ is bonded to N, $R^9$ to $R^{16}$ is a pair of electrons;

b) reacting the intermediate of Formula IBB with a hard Lewis acid to form Formula ICC In another aspect, there is provided a method for making the compound described herein, wherein the method comprises:

a) reacting a compound of Formula IA with a base and $(LG^3)P(NR_{17}R_{18})$ to form an intermediate of Formula IB:

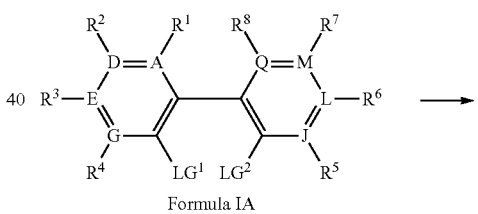

Formula IA

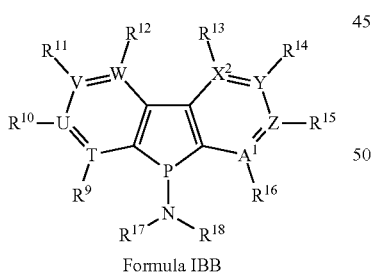

Formula IB wherein $LG^1$, $LG^2$ and $LG^3$ are each independently selected from a leaving group;

$R^{17}$ and $R^{18}$ are each independently selected from a substituted or unsubstituted hydrocarbyl group or $R^{17}$ and $R^{18}$ form a substituted or unsubstituted heterocycle with the N atom; and when any of A, D, E, G, J, L, M and Q are N and any of $R^1$ to $R^8$ is bonded to N, $R^1$ to $R^8$ is a pair of electrons;

b) reacting a compound of Formula IAA with a base and $(LG^3)P(NR_{17}R_{18})$ to form an intermediate of Formula IB:

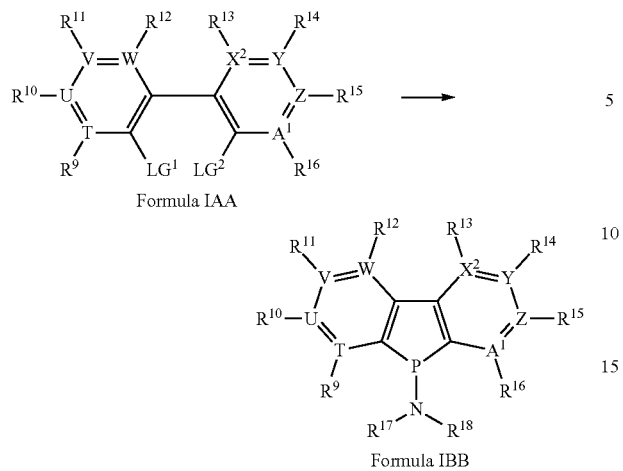

when any of T, U, V, W, A$^1$, Z, Y, X$^2$ are N and any of R$^9$ to R$^{16}$ is bonded to N, R$^9$ to R$^{16}$ is a pair of electrons; and c) reacting the intermediate of Formula IB and the intermediate of Formula IBB with a hard Lewis acid to form Formula ID In another aspect, wherein the leaving group is a weak base. In another aspect, wherein the leaving group is selected from the group consisting of halides, tosylates, mesylates, and perfluoroalkylsulfonates. In another aspect, wherein R$^{17}$ and R$^{18}$ are each independently selected from a substituted or unsubstituted alkyl group. In another aspect, wherein the hard Lewis acid is selected from the group consisting of BF$_3$, BCl$_3$, AlCl$_3$, GaCl$_3$, AlMe$_3$, GaMe$_3$, InMe$_3$, and alumina. In another aspect, wherein the compound of Formula IC, Formula ICC, and/or Formula ID are oxidized such that at least one of X$_1$ and Y$_1$ are O. In another aspect, wherein the compound of Formula IC, Formula ICC, and/or Formula ID are sulfidized such that at least one of X$_1$ and Y$_1$ are S. In another aspect, wherein the compound of Formula IC, Formula ICC, and/or Formula ID are alkylated such that at least one of X$_1$ and Y$_1$ are a substituted or unsubstituted alkyl group. In another aspect, wherein the compound of Formula IC, Formula ICC, and/or Formula ID undergo a boration reaction such that at least one of X$_1$ and Y$_1$ are BR$_1$R$_2$R$_3$. In another aspect, wherein the product is Formula IC', ICC' or ID':

and at least one of the products of Formula IC', ICC' or ID' is reacted with R$^{19}$—X, wherein at least one of A, D, E, G, J, L, M, Q, T, U, V, W, X$^2$, Y, Z, and A, is N and reacts with R$^{19}$—X such that R$^{19}$ bonds to the N and X becomes X$^-$ and R$^{19}$ is independently selected from the same options as R$^1$ to R$^{16}$. In another aspect, wherein the compound of Formula IC, Formula ICC, and/or Formula ID are reacted with R$^{19}$—X, wherein at least one of A, D, E, G, J, L, M, Q, T, U, V, W, X$^2$, Y, Z, and A$_1$ is N and reacts with R$^{19}$—X such that R$^{19}$ bonds to the N and X becomes X$^-$ and R$^{19}$ is independently selected from the same options as R$^1$ to R$^{16}$ to form a salt. In another aspect, wherein the salt is oxidized such that at least one of X$_1$ and Y$_1$ are O. In another aspect, wherein the salt is sulfidized such that at least one of X, and Y$_1$ are S. In another aspect, wherein the salt is alkylated such that at least one of X$_1$ and Y$_1$ are a substituted or unsubstituted alkyl group. In another aspect, wherein the salt undergoes a boration reaction such that at least one of X$_1$ and Y, are BR$_1$R$_2$R$_3$.

It is understood that one or more of the aspects described herein (and above) may be combined in any suitable manner. The novel features of the present invention will become apparent to those of skill in the art upon examination of the following detailed description of the invention. It should be understood, however, that the detailed description of the invention and the specific examples presented, while indicating certain aspects of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present application can be further understood with reference to the following drawings.

DETAILED DESCRIPTION OF CERTAIN ASPECTS

Definitions

Figure 1A:
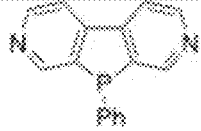
FIGS. 1A-1D show examples of compounds that have further enhanced acceptor properties, evident in the lower energy levels of their frontier orbitals, and the added value of two additional reduction steps, which translates into the ability of up to five-color electrochromism, and enhanced charge storage abilities (up to four electrons).

Unless otherwise explained, all technical and scientific terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only, and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Typically, a composition consisting essentially of a set of components will comprise less than 5% by weight, typically less than 3% by weight, more typically less than 1%, and even more typically less than 0.1% by weight of non-specified component(s).

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

The phrase "at least one of" is understood to be one or more. The phrase "at least one of . . . and . . . " is understood to mean at least one of the elements listed or a combination thereof, if not explicitly listed. For example, "at least one of A, B, and C" is understood to mean A alone or B alone or C alone or a combination of A and B or a combination of A and C or a combination of B and C or a combination of A, B, and C. "At least one of at least one of A, at least one of B, and at least one of C" is understood to mean at least one of A alone or at least one of B alone or at least one of C alone or a combination of at least one of A and at least one of B or a combination of at least one of A and at least one of C or a combination of at least one of B and at least one of C or a combination of at least one of A, at least one of B, and at least one of C.

It is further to be understood that all molecular weight or molecular mass values, are approximate and are provided for description. Although methods and materials similar or equivalent to those described herein can be used in the practice or testing of this disclosure, suitable methods and materials are described below.

With respect to compound terminology, generally, reference to a certain element such as hydrogen or H is meant to, if appropriate, include all isotopes of that element.

Where the term "alkyl group" is used, either alone or within other terms such as "haloalkyl group" and "alkylamino group", it encompasses linear or branched carbon radicals having, for example, one to about twenty carbon atoms or, in specific embodiments, one to about twelve carbon atoms. In other embodiments, alkyl groups are "lower alkyl" groups having one to about six carbon atoms. Examples of such groups include, but are not limited thereto, methyl, ethyl, n-propyl, isopropyl, n-butyl, isobutyl, sec-butyl, tert-butyl, pentyl, iso-amyl, hexyl and the like. In more specific embodiments, lower alkyl groups have one to four carbon atoms.

The term "alkenyl group" encompasses linear or branched carbon radicals having at least one carbon-carbon double bond. The term "alkenyl group" can encompass conjugated and non-conjugated carbon-carbon double bonds or combinations thereof. An alkenyl group, for example and without being limited thereto, can encompass two to about twenty carbon atoms or, in a particular embodiment, two to about twelve carbon atoms. In embodiments, alkenyl groups are "lower alkenyl" groups having two to about four carbon atoms. Examples of alkenyl groups include, but are not limited thereto, ethenyl, propenyl, allyl, propenyl, butenyl and 4-methylbutenyl. The terms "alkenyl group" and "lower alkenyl group", encompass groups having "cis" and "trans" orientations, or alternatively, "E" and "Z" orientations.

The term "alkynyl group" denotes linear or branched carbon radicals having at least one carbon-carbon triple bond. The term "alkynyl group" can encompass conjugated and non-conjugated carbon-carbon triple bonds or combinations thereof. Alkynyl group, for example and without being limited thereto, can encompass two to about twenty carbon atoms or, in a particular embodiment, two to about twelve carbon atoms. In embodiments, alkynyl groups are "lower alkynyl" groups having two to about ten carbon atoms. Some examples are lower alkynyl groups having two to about four carbon atoms. Examples of such groups include propargyl, butynyl, and the like.

The term "halo" means halogens such as fluorine, chlorine, bromine or iodine atoms.

The term "haloalkyl group" encompasses groups wherein any one or more of the alkyl carbon atoms is substituted with halo as defined above. Specifically encompassed are monohaloalkyl, dihaloalkyl and polyhaloalkyl groups including perhaloalkyl. A monohaloalkyl group, for one example, may have either an iodo, bromo, chloro or fluoro atom within the group. Dihalo and polyhaloalkyl groups may have two or more of the same halo atoms or a combination of different halo groups. "Lower haloalkyl group" encompasses groups having 1-6 carbon atoms. In some embodiments, lower haloalkyl groups have one to three carbon atoms. Examples of haloalkyl groups include fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl and dichloropropyl.

The term "hydroxyalkyl group" encompasses linear or branched alkyl groups having, for example and without being limited thereto, one to about ten carbon atoms, any one of which may be substituted with one or more hydroxyl groups. In embodiments, hydroxyalkyl groups are "lower hydroxyalkyl" groups having one to six carbon atoms and one or more hydroxyl groups. Examples of such groups include hydroxymethyl, hydroxyethyl, hydroxypropyl, hydroxybutyl and hydroxyhexyl.

The term "alkoxy group" encompasses linear or branched oxy-containing groups each having alkyl portions of, for example and without being limited thereto, one to about ten carbon atoms. In embodiments, alkoxy groups are "lower alkoxy" groups having one to six carbon atoms. Examples of such groups include methoxy, ethoxy, propoxy, butoxy and tert-butoxy. In certain embodiments, lower alkoxy groups have one to three carbon atoms. The "alkoxy" groups may be further substituted with one or more halo atoms, such as fluoro, chloro or bromo, to provide "haloalkoxy" groups. In other embodiments, lower haloalkoxy groups have one to three carbon atoms. Examples of such groups include fluoromethoxy, chloromethoxy, trifluoromethoxy, trifluoroethoxy, fluoroethoxy, and fluoropropoxy.

The term "aromatic group" or "aryl group" means an aromatic group having one or more rings wherein such rings may be attached together in a pendent manner or may be fused. In particular embodiments, an aromatic group is one, two or three rings. Monocyclic aromatic groups may contain 4 to 10 carbon atoms, typically 4 to 7 carbon atoms, and more typically 4 to 6 carbon atoms in the ring. Typical polycyclic aromatic groups have two or three rings. Polycyclic aromatic groups having two rings typically have 8 to 12 carbon atoms, preferably 8 to 10 carbon atoms in the rings. Examples of aromatic groups include, but are not limited to, phenyl, naphthyl, tetrahydronaphthyl, indanyl, biphenyl, phenanthryl, anthryl or acenaphthyl.

The term "heteroatom" means an atom other than carbon. Typically, heteroatoms are selected from the group consisting of sulfur, phosphorous, nitrogen and oxygen atoms. Groups containing more than one heteroatom may contain different heteroatoms.

The term "heteroaromatic group" or "heteroaryl group" means an aromatic group having one or more rings wherein such rings may be attached together in a pendent manner or may be fused, wherein the aromatic group has at least one heteroatom. Monocyclic heteroaromatic groups may contain 4 to 10 member atoms, typically 4 to 7 member atoms, and more typically 4 to 6 member atoms in the ring. Typical polycyclic heteroaromatic groups have two or three rings. Polycyclic aromatic groups having two rings typically have 8 to 12 member atoms, more typically 8 to 10 member atoms in the rings. Examples of heteroaromatic groups include, but are not limited thereto, pyrrole, imidazole, thiazole, oxazole, furan, thiophene, triazole, pyrazole, isoxazole, isothiazole, pyridine, pyrazine, pyridazine, pyrimidine, triazine, indole, benzofuran, benzothiophene, benzimidazole, benzthiazole, quinoline, isoquinoline, quinazoline, quinoxaline and the like.

The term "carbocyclic group" means a saturated or unsaturated carbocyclic hydrocarbon ring. Carbocyclic groups are not aromatic. Carbocyclic groups are monocyclic or polycyclic. Polycyclic carbocyclic groups can be fused, spiro, or bridged ring systems. Monocyclic carbocyclic groups may contain 4 to 10 carbon atoms, typically 4 to 7 carbon atoms, and more typically 5 to 6 carbon atoms in the ring. Bicyclic carbocyclic groups may contain 8 to 12 carbon atoms, typically 9 to 10 carbon atoms in the rings.

The term "heterocyclic group" means a saturated or unsaturated ring structure containing carbon atoms and 1 or more heteroatoms in the ring. Heterocyclic groups are not aromatic. Heterocyclic groups are monocyclic or polycyclic. Polycyclic heterocyclic groups can be fused, spiro, or bridged ring systems. Monocyclic heterocyclic groups may contain 4 to 10 member atoms (i.e., including both carbon atoms and at least 1 heteroatom), typically 4 to 7, and more typically 5 to 6 in the ring. Bicyclic heterocyclic groups may contain 8 to 18 member atoms, typically 9 or 10 member atoms in the rings. Representative heterocyclic groups include, by way of example, pyrrolidine, imidazolidine, pyrazolidine, piperidine, 1,4-dioxane, morpholine, thiomorpholine, piperazine, 3-pyrroline and the like.

The term "heterogeneous group" means a saturated or unsaturated chain comprising carbon atoms and at least one heteroatom. Heterogeneous groups typically have 1 to 25 member atoms. More typically, the chain contains 1 to 12 member atoms, 1 to 10, and most typically 1 to 6. The chain may be linear or branched. Typical branched heterogeneous groups have one or two branches, more typically one branch. Typically, heterogeneous groups are saturated. Unsaturated heterogeneous groups may have one or more double bonds, one or more triple bonds, or both. Typical unsaturated heterogeneous groups have one or two double bonds or one triple bond. More typically, the unsaturated heterogeneous group has one double bond.

The term "hydrocarbon group" or "hydrocarbyl group" means a chain of 1 to 25 carbon atoms, typically 1 to 12 carbon atoms, more typically 1 to 10 carbon atoms, and most typically 1 to 8 carbon atoms. Hydrocarbon groups may have a linear or branched chain structure. Typical hydrocarbon groups have one or two branches, typically one branch. Typically, hydrocarbon groups are saturated. Unsaturated hydrocarbon groups may have one or more double bonds, one or more triple bonds, or combinations thereof. Typical unsaturated hydrocarbon groups have one or two double bonds or one triple bond; more typically unsaturated hydrocarbon groups have one double bond.

When the term "unsaturated" is used in conjunction with any group, the group may be fully unsaturated or partially unsaturated. However, when the term "unsaturated" is used in conjunction with a specific group defined herein, the term maintains the limitations of that specific group. For example, an unsaturated "carbocyclic group", based on the limitations of the "carbocyclic group" as defined herein, does not encompass an aromatic group.

The terms "carboxy group" or "carboxyl group", whether used alone or with other terms, such as "carboxyalkyl group", denotes —(C=O)—O—.

The term "carbonyl group", whether used alone or with other terms, such as "aminocarbonyl group", denotes —(C=O)—.

The terms "alkylcarbonyl group" denotes carbonyl groups which have been substituted with an alkyl group. In certain embodiments, "lower alkylcarbonyl group" has lower alkyl group as described above attached to a carbonyl group.

The term "aminoalkyl group" encompasses linear or branched alkyl groups having one to about ten carbon atoms any one of which may be substituted with one or more amino groups. In some embodiments, the aminoalkyl groups are "lower aminoalkyl" groups having one to six carbon atoms and one or more amino groups. Examples of such groups include aminomethyl, aminoethyl, aminopropyl, aminobutyl and aminohexyl.

The term "alkylaminoalkyl group" encompasses aminoalkyl groups having the nitrogen atom independently substituted with an alkyl group. In certain embodiments, the alkylaminoalkyl groups are "loweralkylaminoalkyl" groups having alkyl groups of one to six carbon atoms. In other embodiments, the lower alkylaminoalkyl groups have alkyl groups of one to three carbon atoms. Suitable alkylaminoalkyl groups may be mono or dialkyl substituted, such as N-methylaminomethyl, N, N-dimethyl-aminoethyl, N, N-diethylaminomethyl and the like.

The term "aralkyl group" encompasses aryl-substituted alkyl groups. In embodiments, the aralkyl groups are "lower aralkyl" groups having aryl groups attached to alkyl groups having one to six carbon atoms. In other embodiments, the lower aralkyl groups phenyl is attached to alkyl portions having one to three carbon atoms. Examples of such groups include benzyl, diphenylmethyl and phenylethyl. The aryl in said aralkyl may be additionally substituted with halo, alkyl, alkoxy, haloalkyl and haloalkoxy.

The term "arylalkenyl group" encompasses aryl-substituted alkenyl groups. In embodiments, the arylalkenyl groups are "lower arylalkenyl" groups having aryl groups attached to alkenyl groups having two to six carbon atoms. Examples of such groups include phenylethenyl. The aryl in said arylalkenyl may be additionally substituted with halo, alkyl, alkoxy, haloalkyl and haloalkoxy.

The term "arylalkynyl group" encompasses aryl-substituted alkynyl groups. In embodiments, arylalkynyl groups are "lower arylalkynyl" groups having aryl groups attached to alkynyl groups having two to six carbon atoms. Examples of such groups include phenylethynyl. The aryl in said aralkyl may be additionally substituted with halo, alkyl, alkoxy, haloalkyl and haloalkoxy. The terms benzyl and phenylmethyl are interchangeable.

The term "alkylthio group" encompasses groups containing a linear or branched alkyl group, of one to ten carbon atoms, attached to a divalent sulfur atom. In certain embodiments, the lower alkylthio groups have one to three carbon atoms. An example of "alkylthio" is methylthio, ($CH_3S$—).

The term "alkylamino group" denotes amino groups which have been substituted with one alkyl group and with two alkyl groups, including terms "N-alkylamino" and "N,N-dialkylamino". In embodiments, alkylamino groups are "lower alkylamino" groups having one or two alkyl groups of one to six carbon atoms, attached to a nitrogen atom. In other embodiments, lower alkylamino groups have one to three carbon atoms. Suitable "alkylamino" groups may be mono or dialkylamino such as N-methylamino, N-ethylamino, N,N-dimethylamino, N,N-diethylamino and the like.

The term "arylamino group" denotes amino groups which have been substituted with one or two aryl groups, such as N-phenylamino. The "arylamino" groups may be further substituted on the aryl ring portion of the group.

The term "heteroarylamino" denotes amino groups which have been substituted with one or two heteroaryl groups, such as N-thienylamino. The "heteroarylamino" groups may be further substituted on the heteroaryl ring portion of the group.

The term "aralkylamino group" denotes amino groups which have been substituted with one or two aralkyl groups. In other embodiments, there are phenyl-$C_1$-$C_3$-alkylamino groups, such as N-benzylamino. The "aralkylamino" groups may be further substituted on the aryl ring portion of the group.

The term "alkylaminoalkylamino group" denotes alkylamino groups which have been substituted with one or two alkylamino groups. In embodiments, there are $C_1$-$C_3$-alkylamino-$C_1$-$C_3$-alkylamino groups.

The term "arylthio group" encompasses aryl groups of six to ten carbon atoms, attached to a divalent sulfur atom. An example of "arylthio" is phenylthio. The term "aralkylthio group" encompasses aralkyl groups as described above, attached to a divalent sulfur atom. In certain embodiments there are phenyl-$C_1$-$C_3$-alkylthio groups. An example of "aralkylthio" is benzylthio.

The term "aryloxy group" encompasses optionally substituted aryl groups, as defined above, attached to an oxygen atom. Examples of such groups include phenoxy.

The term "aralkoxy group" encompasses oxy-containing aralkyl groups attached through an oxygen atom to other groups. In certain embodiments, aralkoxy groups are "lower aralkoxy" groups having optionally substituted phenyl groups attached to lower alkoxy group as described above.

The term "cycloalkyl group" includes saturated carbocyclic groups. In certain embodiments, cycloalkyl groups include $C_3$-$C_6$ rings. In embodiments, there are compounds that include, cyclopentyl, cyclopropyl, and cyclohexyl.

The term "cycloalkenyl group" includes carbocyclic groups that have one or more carbon-carbon double bonds; conjugated or non-conjugated, or a combination thereof.

"Cycloalkenyl" and "cycloalkyldienyl" compounds are included in the term "cycloalkenyl". In certain embodiments, cycloalkenyl groups include $C_3$-$C_6$ rings. Examples include cyclopentenyl, cyclopentadienyl, cyclohexenyl and cycloheptadienyl. The "cycloalkenyl" group may have 1 to 3 substituents such as lower alkyl, hydroxyl, halo, haloalkyl, nitro, cyano, alkoxy, lower alkylamino, and the like.

The term "suitable substituent", "substituent" or "substituted" used in conjunction with the groups described herein refers to a chemically acceptable group, i.e., a moiety that maintains the utility of the inventive compounds. It is understood that substituents and substitution patterns on the compounds of the invention may be selected by one of ordinary skill in the art to provide compounds that are chemically stable and that can be readily synthesized by techniques known in the art, as well as those methods set forth below. If a substituent is itself substituted with more than one group, it is understood that these multiple groups may be on the same carbon/member atom or on different carbons/member atoms, as long as a stable structure results. Illustrative examples of some suitable substituents include, cycloalkyl, heterocyclyl, hydroxyalkyl, benzyl, carbonyl, halo, haloalkyl, perfluoroalkyl, perfluoroalkoxy, alkyl, alkenyl, alkynyl, hydroxy, oxo, mercapto, alkylthio, alkoxy, aryl or heteroaryl, aryloxy or heteroaryloxy, aralkyl or heteroaralkyl, aralkoxy or heteroaralkoxy, HO—(C═O)—, amido, amino, alkyl- and dialkylamino, cyano, nitro, carbamoyl, alkylcarbonyl, alkoxycarbonyl, alkylaminocarbonyl, dialkylaminocarbonyl, arylcarbonyl, aryloxycarbonyl, alkylsulfonyl, and arylsulfonyl. Typical substituents include aromatic groups, substituted aromatic groups, hydrocarbon groups including alkyl groups such as methyl groups, substituted hydrocarbon groups such as benzyl, and heterogeneous groups including alkoxy groups such as methoxy groups.

The term "fused" means in which two or more carbons/member atoms are common to two adjoining rings, e.g., the rings are "fused rings".

The salts of the compounds described herein include suitable salts of the compounds of this invention as formed, e.g., from inorganic or organic acids. For example, such conventional salts include those derived from inorganic acids such as hydrochloric, hydrobromic, sulfuric, sulfamic, phosphoric, nitric, Lewis acids, and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxy-benzoic, fumaric, toluenesulfonic, methanesulfonic, ethane disulfonic, oxalic, isethionic, trifluoroacetic and the like. With respect to the formation of suitable salts, any suitable counterions may form. A "counterion" or "anionic counterion" is a negatively charged group associated, for example, with a cationic quaternary amino group in order to maintain electrostatic neutrality. Exemplary counterions include halide ions (e.g., $F^-$, $Cl^-$, $Br^-$, $I^-$) $NO_3^-$, $ClO_4^-$, $OH^-$, $H_2PO_4^-$, $HSO_4^-$, $^-BF_4$, $^-PF_6$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), and carboxylate ions (e.g., acetate, ethanoate, propanoate, benzoate, glycerate, lactate, tartrate, glycolate, and the like).

The salts of the compounds described herein can be synthesized from the compounds described herein which contain a basic or acidic moiety by conventional chemical methods. Generally, the salts of the basic compounds are prepared either by ion exchange chromatography or by reacting the free base with stoichiometric amounts or with an excess of the desired salt-forming inorganic or organic acid in a suitable solvent or various combinations of solvents. Similarly, the salts of the acidic compounds are formed by reactions with the appropriate inorganic or organic base.

The term "derivative" generally refers to a molecule that has been modified and/or changed in any way relative to a reference molecule or starting molecule.

The term "viologen" is understood to be a quaternized bipyridine system.

The term "phosphaviologen" is understood to mean a phosphorus-bridged or phosphole-fused viologen.

The term "phosphaviologen derivative" is understood to mean a derivative of a phosphorus-bridged or phosphole-fused viologen.

The term "leaving group" is well understood in the art and is a molecular fragment that departs with a pair of electrons in a heterolytic bond cleavage. Leaving groups can be anions or neutral molecules, and is able to stabilize the additional electron density that results from bond heterolysis.

The term "electrolyte" is well understood in the art and provides a charge-carrying pathway between the negative electrode and the positive electrode. The electrolyte can include a charge-carrying medium and a lithium salt.

The term "negative electrode" is well understood in the art and refers to one of a pair of electrodes that, under normal circumstances and when the battery/cell is fully charged, has the lowest potential. The negative electrode can be generally selected from those known in the art, for example, a graphitic anode.

The term "positive electrode" is well understood in the art and refers to one of a pair of electrodes that, under typical circumstances, and when the battery/cell is fully charged, will have the highest potential that it can achieve under normal operation. A passivating electrolyte additive is a composition added that can stabilize the surface of anode, typically by forming a passivation film.

Phosphaviologens and Compositions Thereof

Organophosphorus building blocks with highly optoelectronic and morphological properties. One of the most prominent examples of building blocks in this context is phosphole, a five-membered heterocycle. The aromaticity of phospholes are rather limited.

The strong s character of the phosphorus lone pair makes it unsuitable for conjugation with the π orbital of the butadiene moiety. Rather, the phosphole's limited aromaticity stems from the hyperconjugation of the σ orbital of the exocyclic P—R moiety with the butadiene p orbital (Baumgartner, T. (2014). Insights on the Design and Electron-Acceptor Properties of Conjugated Organophosphorus Materials. Acc. Chem. Res. 47, 1613-1622). Therein lies the foundation for both the chemistry as well as the beneficial optoelectronic properties of phospholes. Chemically, since the lone pair is localized on the phosphorus, it is available for further modifications such as oxidation and coordination (Baumgartner, T., and Reáu, R. (2006). Organophosphorus π-Conjugated Materials. Chem. Rev. 106, 4681-4727). Due to its conjugation with the π backbone, exocyclic P—R moiety can affect the electronics of the system directly. With the σ*-π* hyperconjugation, the lowest unoccupied molecular orbital (LUMO) energy of the molecule can be lowered due to the enlarged conjugation. This has enabled phospholes to be used as luminescent and electron acceptor materials in a range of applications (Baumgartner, T., and Reáu, R. (2006). Organophosphorus π-Conjugated Materials. Chem. Rev. 106, 4681-4727). P—P bridged biphospholes are particularly appealing, as the two phosphole units are connected electronically via σ*-π* hyperconjugation through the P—P bridge (Nyulászi, L. (2001). Aromaticity of Phosphorus Heterocycles. Chem. Rev. 101, 1229-1246). These compounds can have enhanced acceptor properties and provide new highly sought-after n-type materials.

A new class of viologen derivatives are described herein, which include specific phosphaviologen derivatives. In embodiments, the phosphaviologen derivatives described herein have strong electron-accepting properties and can be used to provide phosphaviologen derivative-containing electronic materials. In certain embodiments, the phosphaviologen derivatives include dimeric phosphaviologens.

Some embodiments include a compound which has the structure of Formula I:

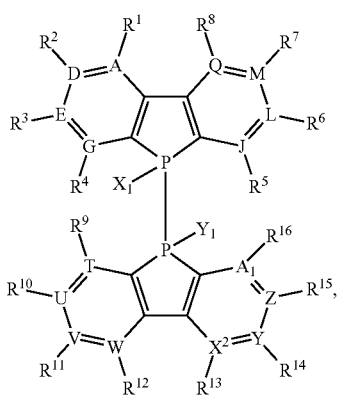

Formula I a salt, hydrate, solvate, tautomer, optical isomer, or combination thereof;
wherein:
A, D, E, G, J, L, M, Q, T, U, V, W, $X^2$, Y, Z, and $A_1$ are each independently selected from C or N;
$R^1$ to $R^{16}$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic, and when any one of $R^1$ to $R^{16}$ is bonded to N, $R^1$ to $R^{16}$ is optionally, a pair of electrons; and
$X_1$ and $Y_1$ are each independently selected from a pair of electrons, O, S, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, a substituted or unsubstituted heteroaromatic, or $BR_1R_2R_3$, wherein $R_1$ to $R_3$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic.

With respect to P—X, or P—$Y_1$ represented as a single bond in Formula I, it is understood that the resonance structures (e.g. a double bond) are also encompassed in the representation, as appropriate.

In other embodiments, one or two of A, D, E, and G are N; one or two of J, L, M, and Q are N; one or two of T, U, V, and W are N; and/or one or two of, $X^2$, Y, Z, and A, are N. In another embodiment, one of A, D, E, and G are N; one or two of J, L, M, and Q are N; one or two of T, U, V, and W are N; and/or one or two of, $X^2$, Y, Z, and $A_1$ are N. In yet another embodiment, one of A, D, E, and G are N; one of J, L, M, and Q are N; one or two of T, U, V, and W are N; and/or one or two of, $X^2$, Y, Z, and $A_1$ are N. In yet another embodiment, one of A, D, E, and G are N; one of J, L, M, and Q are N; one of T, U, V, and W is N; and/or one or two of, $X^2$, Y, Z, and A, are N. In yet another embodiment, one of A, D, E, and G is N; one of J, L, M, and Q is N; one of T, U, V, and W is N; and/or one of, $X^2$, Y, Z, and $A_1$ is N.

In another embodiment, at least one of E, L, U, and Z is N and A, D, G, J, M, Q, T, V, W, $X^2$, Y, and $A_1$ are each C. In another embodiment, at least one of D, M, V, and Y is N and A, E, G, J, L, Q, T, U, W, $X^2$, Z, and A, are each C. In another embodiment, at least one of A, Q, W, and $X^2$ is N and D, E, G, J, L, M, T, U, V, Y, Z, and $A_1$ are each C. In another embodiment, at least one of G, J, T, and $A_1$ is N and A, D, E, L, M, Q, U, V, W, $X^2$, Y, and Z are each C.

In further embodiments, $R^1$ to $R^{16}$ and $R_1$ to $R_3$ are each independently selected from H, a halo group, a hydroxyl group, a substituted or unsubstituted alkyl group, a substituted or unsubstituted alkenyl group, a substituted or unsubstituted alkynyl group, a substituted or unsubstituted aromatic group, a substituted or unsubstituted heteroaromatic group, a substituted or unsubstituted carbocyclic group, a substituted or unsubstituted heterocyclic group, or when $R^1$ to $R^{16}$ is bonded to N, any one of $R^1$ to $R^{16}$ is optionally, a pair of electrons. In another embodiment, wherein $R^1$ to $R^{16}$ and $R_1$ to $R_3$ are each independently selected from H, a substituted or unsubstituted alkyl group, a substituted or unsubstituted alkenyl group, a substituted or unsubstituted aromatic group, a substituted or unsubstituted heteroaromatic group, or when $R^1$ to $R^{16}$ is bonded to N, any one of $R^1$ to $R^{16}$ is optionally, a pair of electrons. In more specific embodiments, wherein $R^1$ to $R^{16}$ and and $R_1$ to $R_3$ are each independently selected from H, a substituted or unsubstituted $C_1$-$C_6$ alkyl group, a substituted or unsubstituted $C_2$-$C_6$ alkenyl group, a substituted or unsubstituted alkylaryl group, a substituted or unsubstituted alkylheteroaryl group, a substituted or unsubstituted aryl group, a substituted or unsubstituted heteroaryl group, or when $R^1$ to $R^{16}$ is bonded to N, any one of $R^1$ to $R^{16}$ is optionally, a pair of electrons. In certain embodiments, $R^1$ to $R^{16}$ and $R_1$ to $R_3$ are each independently selected from H, a substituted or unsubstituted $C_1$-$C_6$ alkyl group, substituted or unsubstituted benzyl group, a substituted or unsubstituted aryl group, or when $R^1$ to $R^{16}$ is bonded to N, any one of $R^1$ to $R^{16}$ is optionally, a pair of electrons. In further embodiments, $R^1$ to $R^{16}$ and $R_1$ to $R_3$ are each independently selected from H, a $C_1$-$C_6$ alkyl group, a benzyl group, an aryl group, or when $R^1$ to $R^{16}$ is bonded to N, any one of $R^1$ to $R^{16}$ is optionally, a pair of electrons.

In other embodiments, one or two of $R^1$ to $R^4$ are selected from a substituted or unsubstituted $C_1$-$C_6$ alkyl group, substituted or unsubstituted benzyl group, or a substituted or unsubstituted aryl group; one or two of $R^5$ to $R^8$ are selected from a substituted or unsubstituted $C_1$-$C_6$ alkyl group, substituted or unsubstituted benzyl group, or a substituted or unsubstituted aryl group; one or two of $R^9$ to $R^{12}$ are selected from a substituted or unsubstituted $C_1$-$C_6$ alkyl group, substituted or unsubstituted benzyl group, or a substituted or unsubstituted aryl group; and/or one or two of $R^{13}$ to $R^{16}$ are selected from a substituted or unsubstituted $C_1$-$C_6$ alkyl group, substituted or unsubstituted benzyl group, or a substituted or unsubstituted aryl group; and the remaining R groups are each independently selected from H or an alkyl group (e.g. $C_1$-$C_6$ alkyl group). In another embodiment, one of $R^1$ to $R^4$ is selected from a substituted or unsubstituted $C_1$-$C_6$ alkyl group, substituted or unsubstituted benzyl group, or a substituted or unsubstituted aryl group; one of $R^5$ to $R^8$ is selected from a substituted or unsubstituted $C_1$-$C_6$ alkyl group, substituted or unsubstituted benzyl group, or a substituted or unsubstituted aryl group; one of $R^9$ to $R^{12}$ is selected from a substituted or unsubstituted $C_1$-$C_6$ alkyl group, substituted or unsubstituted benzyl group, or a substituted or unsubstituted aryl group; and/or one of $R^{13}$ to $R^{16}$ is selected from a substituted or unsubstituted $C_1$-$C_6$ alkyl group, substituted or unsubstituted benzyl group, or a substituted or unsubstituted aryl group; and the remaining R groups are each independently selected from H or an alkyl group (e.g. $C_1$-$C_6$ alkyl group). In yet another embodiment, the remaining R groups are H.

In additional embodiments in various combinations to the above, $X_1$ and $Y_1$ are each independently selected from a pair of electrons, O, S, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, a substituted or unsubstituted heteroaromatic, or $BR_1R_2R_3$, wherein $R_1$ to $R_3$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic. In certain embodiments, $X_1$ and $Y_1$ are each independently selected from a pair of electrons, O, S, a substituted or unsubstituted hydrocarbon group, or $BR_1R_2R_3$. In other embodiments, $X_1$ and $Y_1$ are each independently selected from a pair of electrons, O, S, a substituted or unsubstituted $C_1$-$C_6$ alkyl group, $BH_3$, or $BF_3$. In other embodiments, $X_1$ and $Y_1$ are each independently selected from a pair of electrons, O, or S. In a further embodiment, $X_1$ and $Y_1$ are the same.

Additional embodiments include, without being limited thereto, compounds such as:

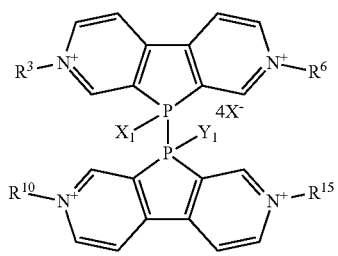

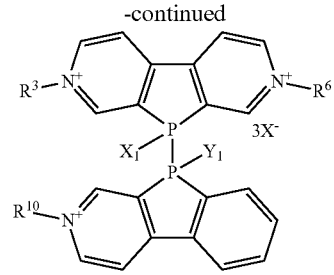

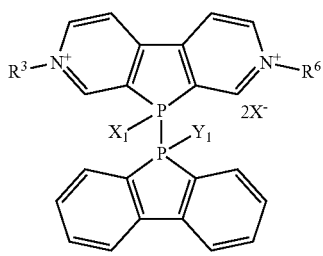

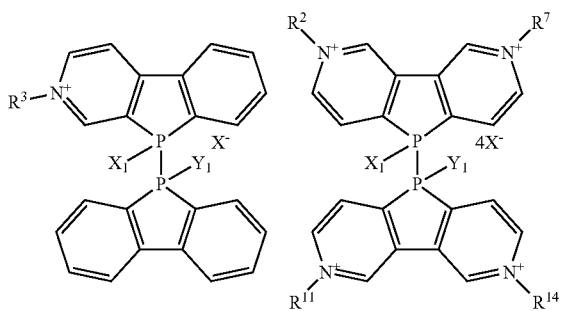

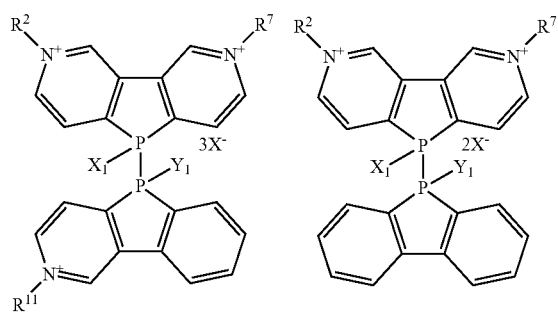

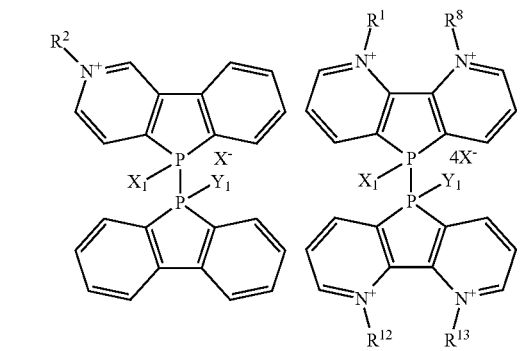

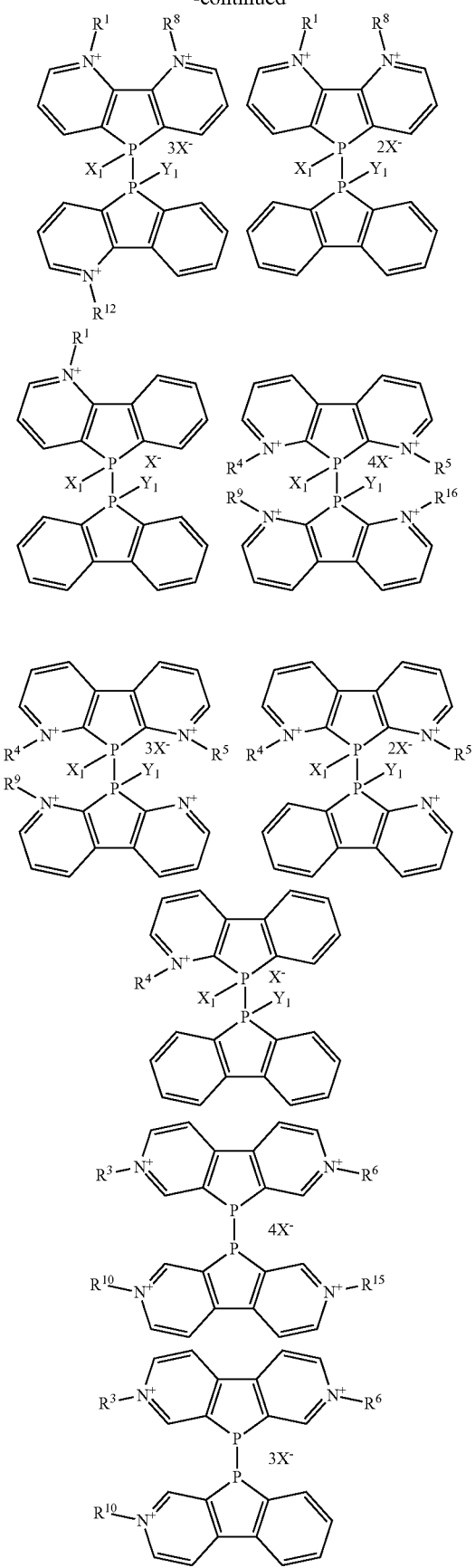
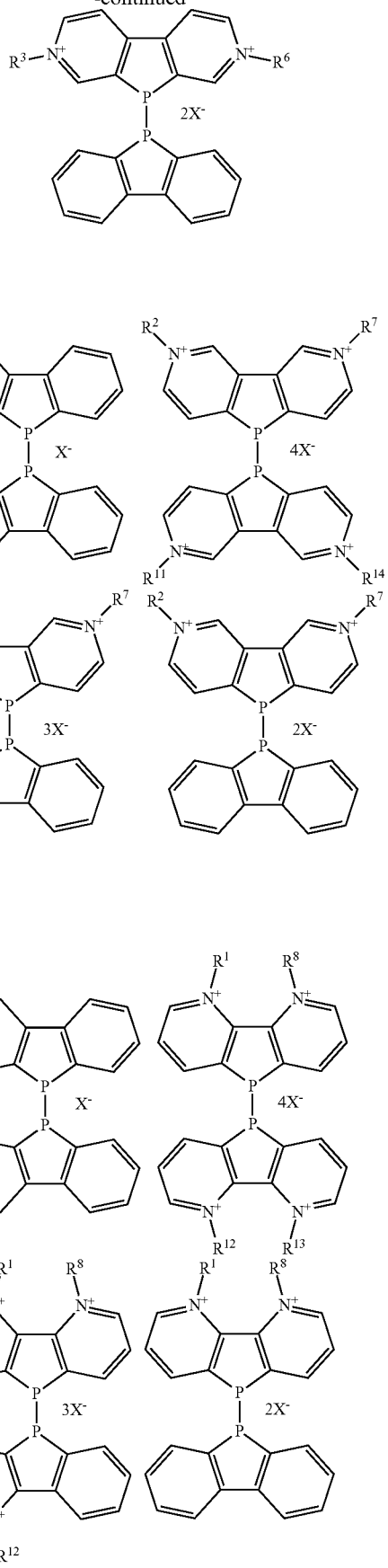

-continued

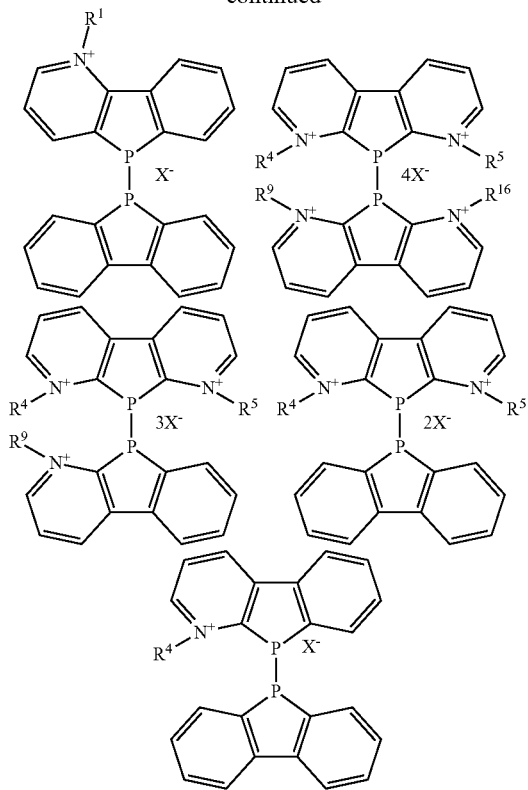

wherein X⁻ can be any suitable counterion. In some embodiments, X⁻ is selected from halide ions (e.g., F⁻, Cl⁻, Br⁻, I⁻) $NO_3^-$, $ClO_4^-$, OH⁻, $H_2PO_4^-$, $HSO_4^-$, $^-BF_4$, $^-PF_6$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), or carboxylate ions (e.g., acetate, ethanoate, propanoate, benzoate, glycerate, lactate, tartrate, glycolate, and the like). In more specific embodiments, X⁻is selected from Br⁻, $^-SO_3CF_3$, $^-BF_4$, or $^-PF_6$. In addition, the $X_1$, $Y_1$, and the R groups can be as outlined above.

In embodiments, at least one of $R^3$, $R^6$, $R^{10}$, and $R^{15}$ is selected from a substituted or unsubstituted $C_1$-$C_6$ alkyl group, substituted or unsubstituted benzyl group, or a substituted or unsubstituted aryl group; more particularly, at least one of $R^3$, $R^6$, $R^{10}$, and $R^{15}$ is selected from methyl group, a substituted or unsubstituted benzyl group, or a substituted or unsubstituted aryl group; and even more particularly, at least one of $R^3$, $R^6$, $R^{10}$, and $R^{15}$ is selected from methyl group, a benzyl group, or an aryl group (e.g. phenyl group). In other embodiments $R^3$, $R^6$, $R^{10}$, and $R^{15}$ are the same.

In embodiments, at least one of $R^2$, $R^7$, $R^{11}$, and $R^{14}$ is selected from a substituted or unsubstituted $C_1$-$C_6$ alkyl group, substituted or unsubstituted benzyl group, or a substituted or unsubstituted aryl group; more particularly, at least one of $R^2$, $R^7$, $R^{11}$, and $R^{14}$ is selected from methyl group, a substituted or unsubstituted benzyl group, or a substituted or unsubstituted aryl group; and even more particularly, at least one of $R^2$, $R^7$, $R^{11}$, and $R^{14}$ is selected from methyl group, a benzyl group, or an aryl group (e.g. phenyl group). In other embodiments $R^2$, $R^7$, $R^{11}$, and $R^{14}$ are the same.

In embodiments, at least one of $R^1$, $R^8$, $R^{12}$, and $R^{13}$ is selected from a substituted or unsubstituted $C_1$-$C_6$ alkyl group, substituted or unsubstituted benzyl group, or a substituted or unsubstituted aryl group; more particularly, at least one of $R^1$, $R^8$, $R^{12}$, and $R^{13}$ is selected from methyl group, a substituted or unsubstituted benzyl group, or a substituted or unsubstituted aryl group; and even more particularly, at least one of $R^1$, $R^8$, $R^{12}$, and $R^{13}$ is selected from methyl group, a benzyl group, or an aryl group (e.g. phenyl group). In other embodiments $R^1$, $R^8$, $R^{12}$, and $R^{13}$ are the same.

In embodiments, at least one of $R^4$, $R^5$, $R^9$, and $R^{16}$ is selected from a substituted or unsubstituted $C_1$-$C_6$ alkyl group, substituted or unsubstituted benzyl group, or a substituted or unsubstituted aryl group; more particularly, at least one of $R^4$, $R^5$, $R^9$, and $R^{16}$ is selected from methyl group, a substituted or unsubstituted benzyl group, or a substituted or unsubstituted aryl group; and even more particularly, at least one of $R^4$, $R^5$, $R^9$, and $R^{16}$ is selected from methyl group, a benzyl group, or an aryl group (e.g. phenyl group). In other embodiments $R^4$, $R^5$, $R^9$, and $R^{16}$ are the same.

Other embodiments include, without being limited thereto, compounds such as:

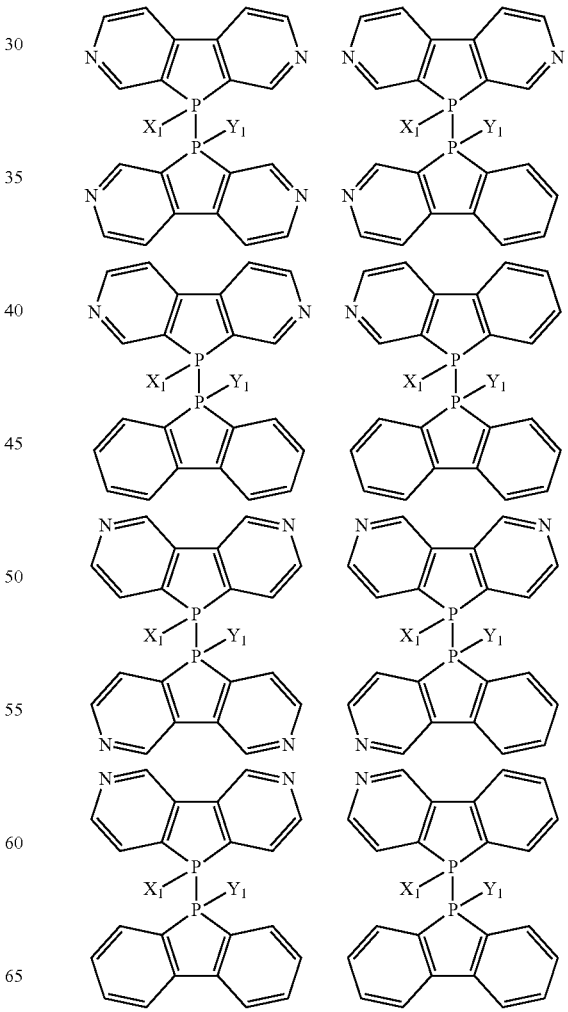

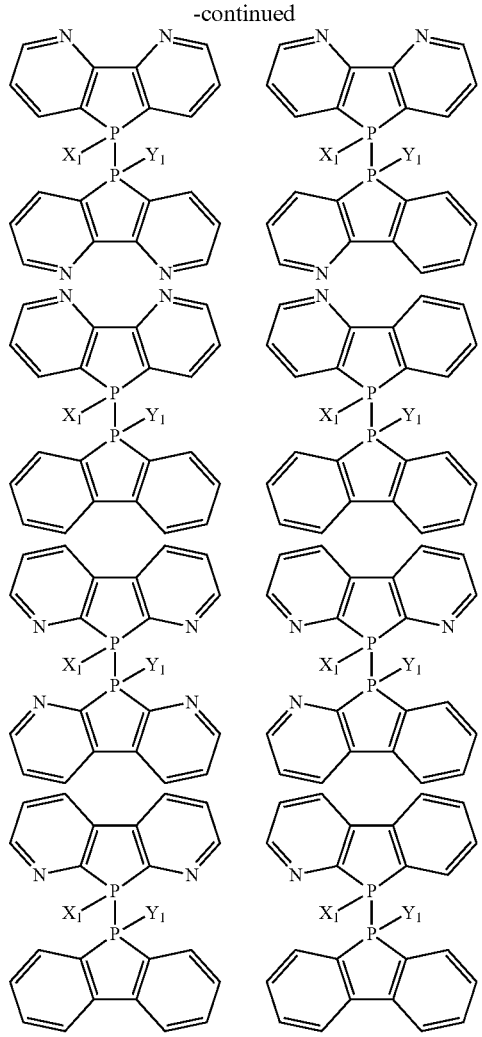

In addition, the $X_1$, $Y_1$, and the R groups can be as outlined above.

Other embodiments include, without being limited thereto, compounds such as:

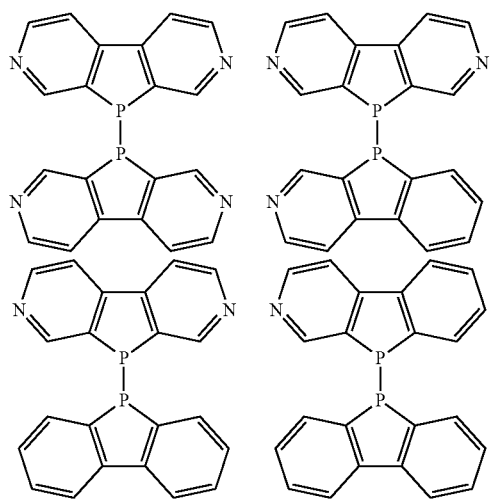

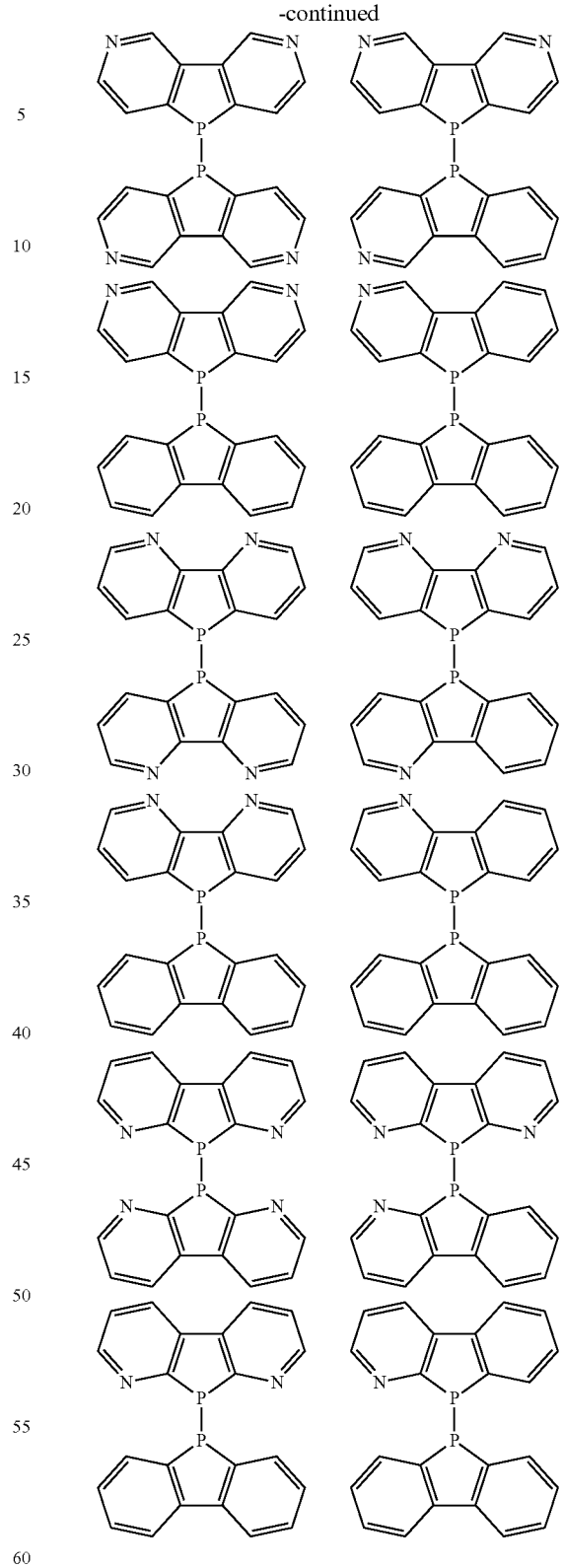

In embodiments, the compound may have a step-like shape. The two phosphole moieties are connected through an out-of-plane P—P σ bond. Due to the anticipated strong p character of the P—P σ bond, in some embodiments, it is angled about 70° to about 90° to the conjugated phosphole planes. The head-to-head conformation may enable efficient packing of the molecules with close contact and orbital overlap. In some embodiments, the compounds may pack in a 'herringbone' motif.

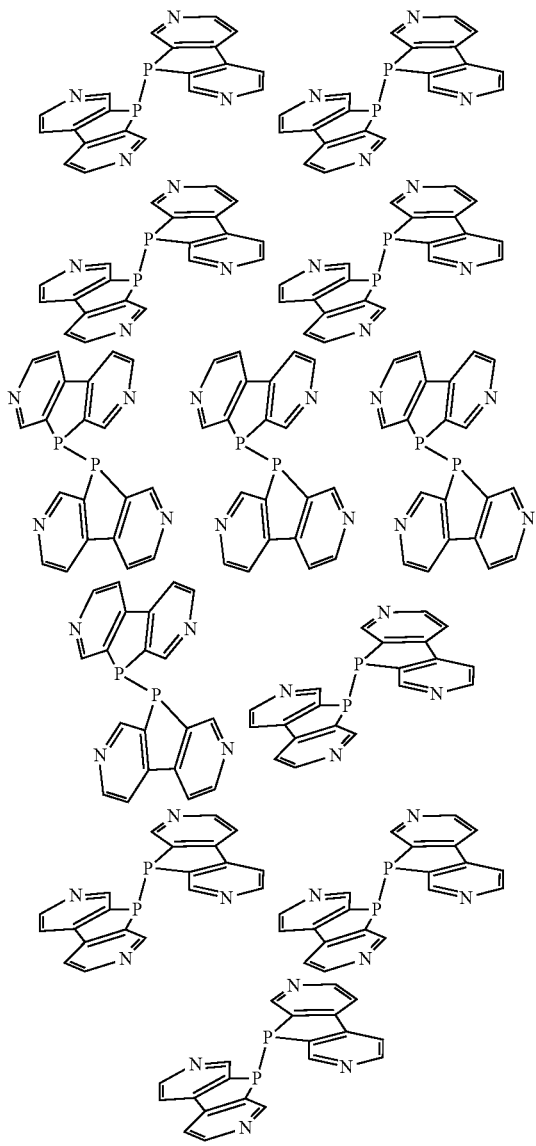

Figure 1B:
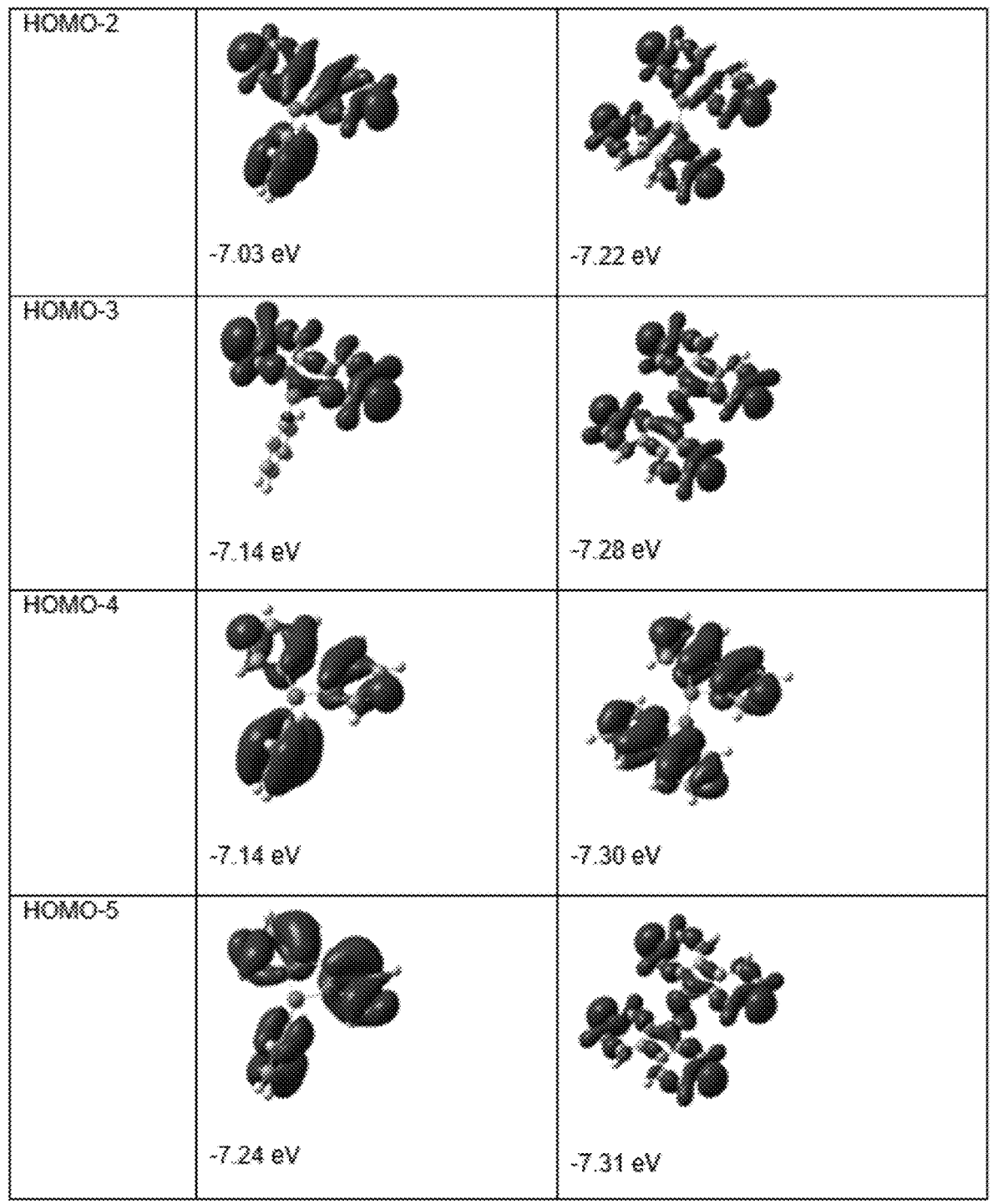
Figure 1C:
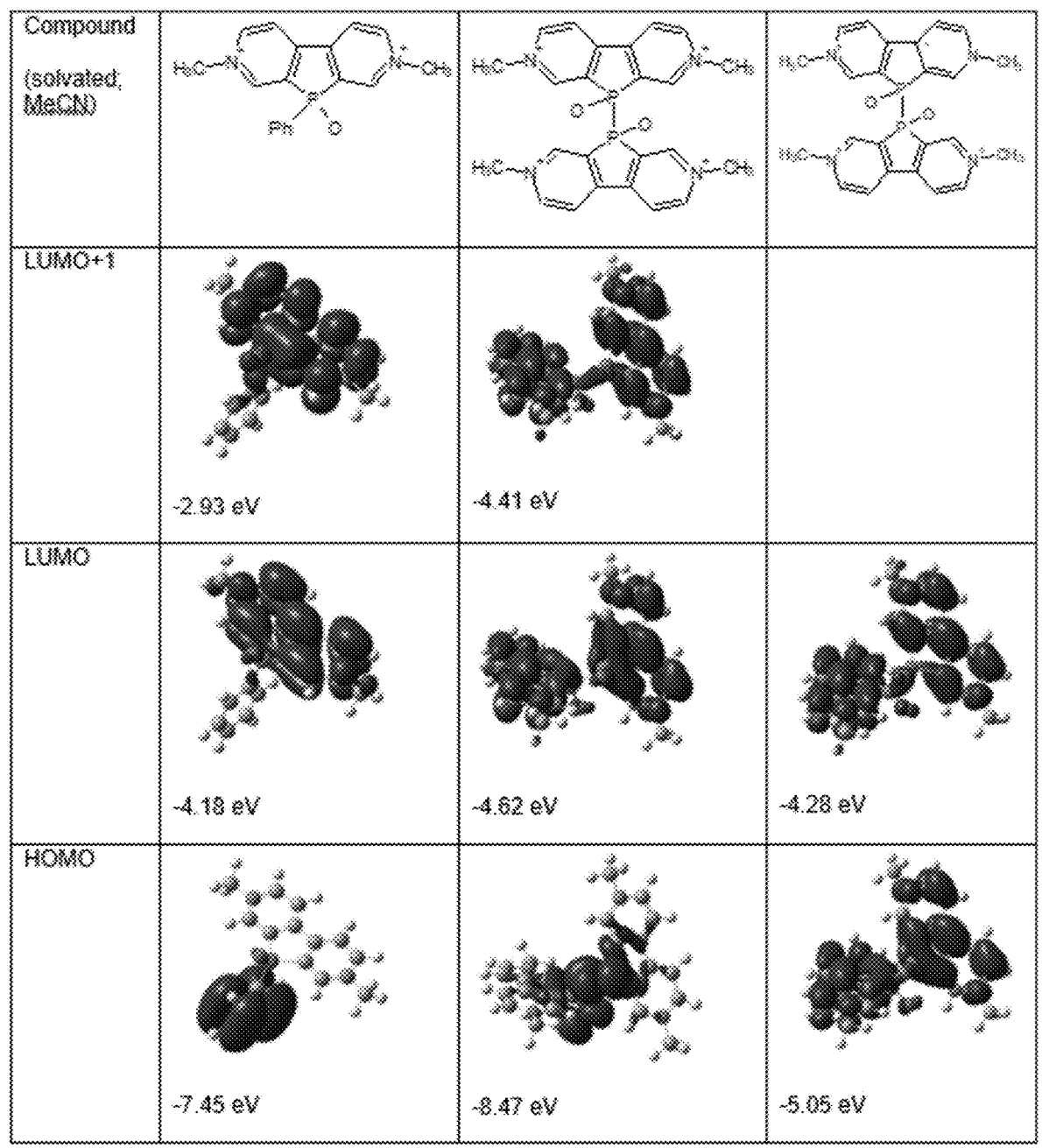
Figure 1D:
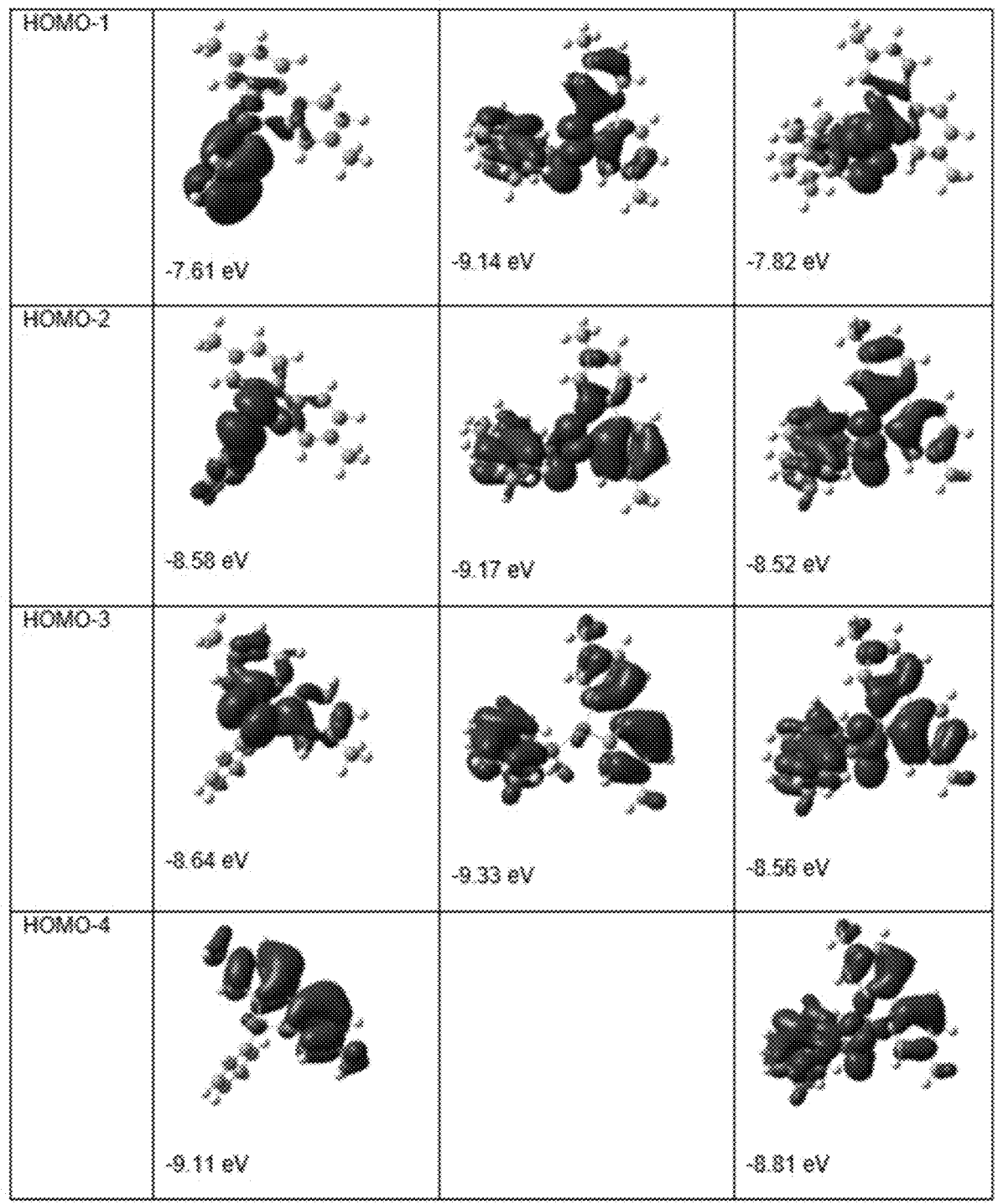

The phosphaviologen derivative compounds disclosed herein can be used in compositions, singly or in combination. The phosphaviologen derivatives disclosed herein may be used in a variety of applications such as, redox mediators, electrochromic devices, and as electrode materials for organic batteries. Density Functional Theory (DFT) calculations on the B3LYP/6-31G(d) level of theory reveal that most embodiments of the compounds disclosed herein have favorable electronic properties of conventional phosphaviologens, as visualized via the corresponding frontier orbitals, and thus similar utility in the applications mentioned below. Notably, the compounds disclosed herein have further enhanced acceptor properties, evident in the lower energy levels of their frontier orbitals, and the added value of two additional reduction steps, which translates into the ability of up to five-color electrochromism, and enhanced charge storage abilities (up to four electrons), as shown in FIGS. 1A-1D.

The phosphaviologen derivative compounds disclosed herein utilize four redox steps, compared to two redox steps of the phosphaviologen and compared to only one of conventional viologen. In embodiments, theoretical specific capacity is increased, which is advantageous for use of organic materials in battery applications. In further embodiments, twice the electrons and an overall reduced molecular weight compared to conventional phosphaviologens and viologens. In embodiments, the compounds disclosed herein has a commercially viable threshold of about 150 to about 250 mAh/g, specifically, about 180 to about 250 mAh/g, or more specifically about 190 to about 250 mAh/g.

An electrochromic device is a self-contained, two-electrode (or more) electrolytic cell that includes an electrolyte and one or more electrochromic materials. Electrochromic materials can be organic or inorganic, and reversibly change visible color when oxidized or reduced in response to an applied electrical potential. Electrochromic devices are therefore constructed so as to modulate incident electromagnetic radiation via transmission, absorption, or reflection of the light upon the application of an electric field across the electrodes. The electrodes and electrochromic materials used in the devices are dependent on the type of device, i.e., absorptive/transmissive or absorptive/reflective. The various phosphaviologen compounds disclosed herein may be used as the electrochromic material.

In some embodiments, the phosphaviologen compounds disclosed herein can be used, singly, in combination, or in compositions, as passivating electrolyte additives for lithium-ion, sodium-ion, and other batteries. In some embodiments, the compound can be used as an electrode material in a battery including non-aqueous redox flow batteries.

With respect to a battery, such as a rechargeable battery, the phosphaviologen compounds disclosed herein can be used, singly, in combination, or in compositions within the battery. In some embodiments, the rechargeable battery includes a negative electrode, a positive electrode, and an electrolyte that includes at least one of the compounds as disclosed herein. In some embodiments, the positive electrode is immersed in the electrolyte. In some embodiments, the electrolyte further comprises a charge-carrying medium. In some embodiments, the electrolyte further includes a lithium salt. In some embodiments, the rechargeable battery is a rechargeable lithium-ion battery, which includes a high-voltage cathode, a negative electrode, an electrolyte comprising a charge-carrying medium and a lithium salt, and at least one compound as disclosed herein. In some embodiments, the battery makes use of at least one compound at a concentration of about 0.05 to about 0.1 M. In some embodiments, the battery makes use of at least one compound having a solubility of about 0.5 M or greater.

The presently-disclosed subject matter is further inclusive of an article that includes a battery as disclosed herein. Batteries connected in series can be particularly vulnerable to overcharge. The presently-disclosed subject matter is inclusive of an array that includes two or more batteries as disclosed herein. In some embodiments, the array includes two or more batteries connected in a series.

Method of Making Phosphaviologens and Building Blocks

The compounds described herein can be made using a variety of methods. In one embodiment of the method, the compounds can be made as follows and the groups are defined as in the previous section:

a) A compound of Formula IA is reacted with a suitable base and $(LG^3)P(NR_{17}R_{18})$ to form an intermediate of Formula IB:

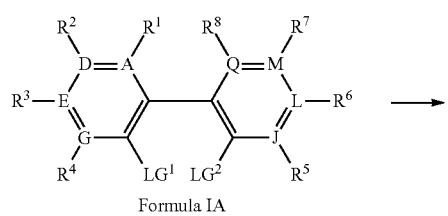

Formula IA

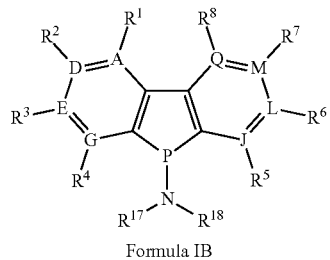

Formula IB wherein LG$^1$, LG$^2$ and LG$^3$ are each independently selected from suitable leaving groups. Any suitable leaving group can be used and, for example, can be selected from a weak base such as halides (e.g., Cl, Br, I), tosylates, mesylates, and perfluoroalkylsulfonates. R$^{17}$ and R$^{18}$ are each independently selected from any suitable substituted or unsubstituted hydrocarbyl group. Typically, R$^{17}$ and R$^{18}$ are each independently selected from any suitable substituted or unsubstituted alkyl group. More particularly, R$^{17}$ and R$^{18}$ are each independently selected from any suitable substituted or unsubstituted C$_1$-C$_6$ alkyl group such as methyl, ethyl etc. R$^{17}$ and R$^{18}$ can also form a substituted or unsubstituted heterocycle with the N atom (e.g. NR$^{17}$R$^{18}$ can be a pyrrole). When any of R$^1$ to R$^8$ is bonded to N, R$^1$ to R$^8$ is a pair of electrons.

b) The intermediate of Formula IB is reacted with an acid to yield Formula IC.

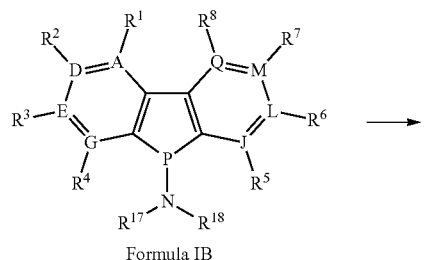

Formula IB

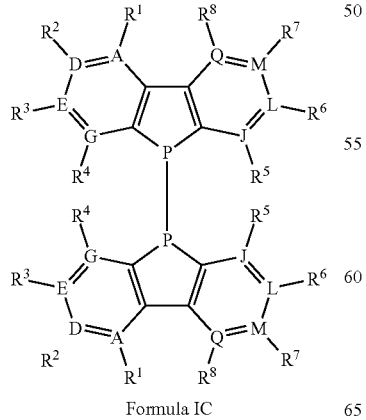

Formula IC

The acid can be any suitable acid specific to react with the nitrogen of the amine to permit the phosphorus lone pair to be available for dimerization. The acid(s) may be selected from any suitable hard Lewis acid such as, for example, BF$_3$, BCl$_3$, AlCl$_3$, GaCl$_3$, AlMe$_3$, GaMe$_3$, InMe$_3$, or alumina (see additional examples in Pearson, R. G. (1963). Hard and Soft Acids and Bases. J. Am. Chem. Soc. 85, 3533-3539).

In another embodiment, the compounds can be made as follows and the groups are defined as in the previous section:

a) A compound of Formula IAA is reacted with a suitable base and (LG$^3$)P(NR$_{17}$R$_{18}$) to form an intermediate of Formula IBB:

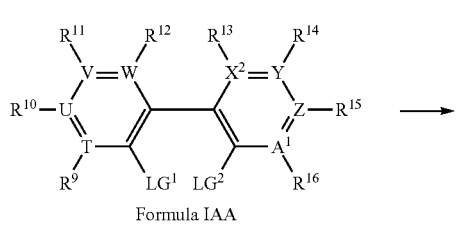

Formula IAA

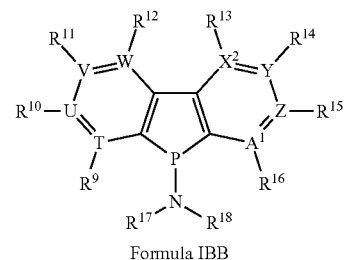

Formula IBB wherein LG$^1$, LG$^2$ and LG$^3$ are each independently selected from suitable leaving groups. Any suitable leaving group can be used and, for example, can be selected from a weak base such as halides (e.g., Cl, Br, I), tosylates, mesylates, and perfluoroalkylsulfonates. R$^{17}$ and R$^{18}$ are each independently selected from any suitable substituted or unsubstituted hydrocarbyl group. Typically, R$^{17}$ and R$^{18}$ are each independently selected from any suitable substituted or unsubstituted alkyl group. More particularly, R$^{17}$ and R$^{18}$ are each independently selected from any suitable substituted or unsubstituted C$_1$-C$_6$ alkyl group such as methyl, ethyl etc. When any of R$^1$ to R$^3$ is bonded to N, R$^1$ to R$^8$ is a pair of electrons.

b) The intermediate of Formula IBB is reacted with an acid to yield Formula ICC.

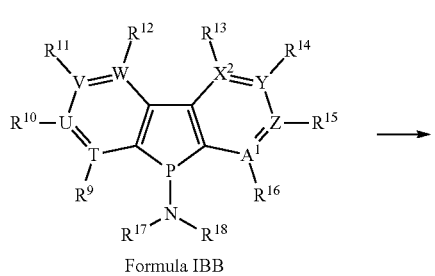

Formula IBB

-continued

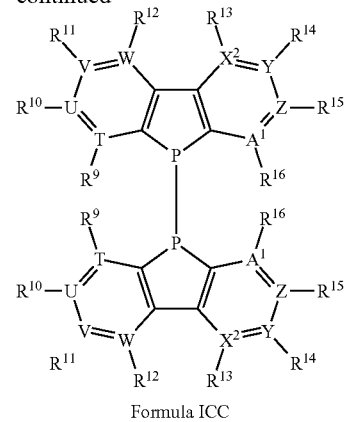

Formula ICC

The acid can be any suitable acid specific to react with the nitrogen of the amine to permit the phosphorus lone pair to be available for dimerization. The acid(s) may be selected from any suitable hard Lewis acid such as, for example, $BF_3$, $BCl_3$, $AlCl_3$, $GaCl_3$, $AlMe_3$, $GaMe_3$, $InMe_3$, or alumina (see additional examples in Pearson, R. G. (1963). Hard and Soft Acids and Bases. J. Am. Chem. Soc. 85, 3533-3539).

In another embodiment, the compounds can be made as follows and the groups are defined as in the previous section:
a) A compound of Formula IA is reacted with a suitable base and $(LG^3)P(NR_{17}R_{18})$ to form an intermediate of Formula IB:

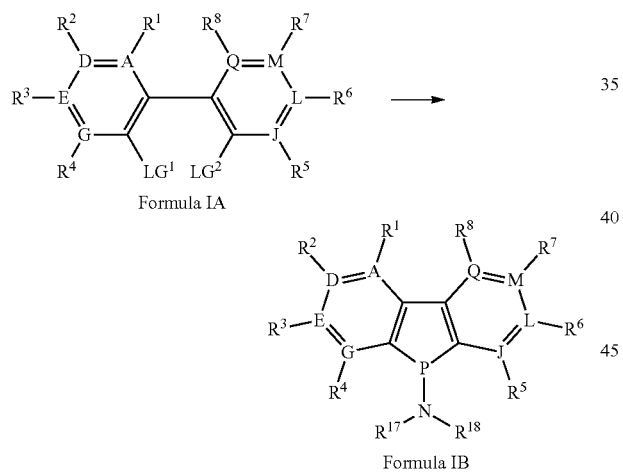

Formula IA

Formula IB wherein $LG^1$, $LG^2$ and $LG^3$ are each independently selected from suitable leaving groups. Any suitable leaving group can be used and, for example, can be selected from a weak base such as halides (e.g., Cl, Br, I), tosylates, mesylates, and perfluoroalkylsulfonates. $R^{17}$ and $R^{18}$ are each independently selected from any suitable substituted or unsubstituted hydrocarbyl group. Typically, $R^{17}$ and $R^{18}$ are each independently selected from any suitable substituted or unsubstituted alkyl group. More particularly, $R^{17}$ and $R^{18}$ are each independently selected from any suitable substituted or unsubstituted $C_1$-$C_6$ alkyl group such as methyl, ethyl etc. When any of $R^1$ to $R^8$ is bonded to N, $R^1$ to $R^8$ is a pair of electrons.

b) A compound of Formula IAA is reacted with a suitable base and $(LG^3)P(NR_{17}R_{18})$ to form an intermediate of Formula IBB:

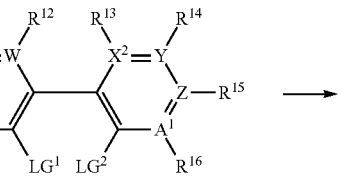

Formula IAA

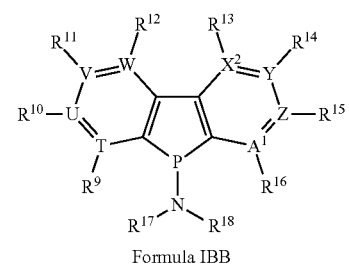

Formula IBB when any of T, U, V, W, $A^1$, Z, Y, $X^2$ are N and any of $R^9$ to $R^{16}$ is bonded to N, $R^9$ to $R^{16}$ is a pair of electrons; and c) The intermediate of Formula IB and the intermediate of Formula IBB is reacted with a hard Lewis acid to form Formula ID

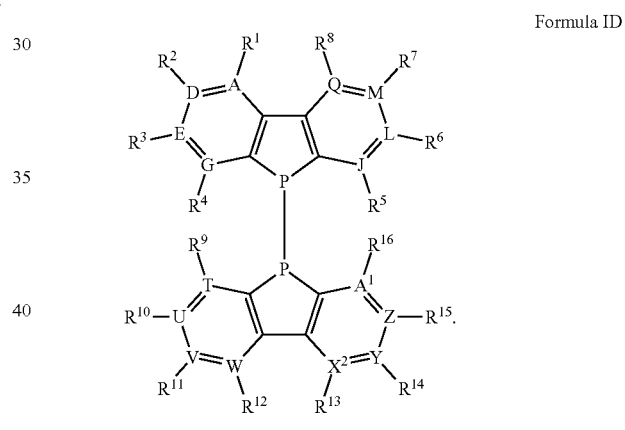

Formula ID

In order to yield Formula I, wherein X, and $Y_1$ are each independently selected from a pair of electrons, O, S, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, a substituted or unsubstituted heteroaromatic, or $BR_1R_2R_3$, wherein $R_1$ to $R_3$ are each independently from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic, Formula I, including Formula IC, ICC and ID, can be oxidized, for example, using oxidation agents such as bis-(trimethylsilyl)-peroxide $((Me_3SiO)_2)$, t-butylhydroperoxide, or hydrogenperoxide, to form $X_1$ and $Y_1$ is O; Formula I, including Formula IC, ICC and ID, and can undergo sulfidation, for example, using Lawesson's reagent or elemental sulfur, to form $X_1$ and $Y_1$ is S. Based on this and the further knowledge of one skilled in the art, one would know how to synthesize the compounds with the various X, and $Y_1$ groups (e.g. Romero-Nieto C. and Baumgartner T. (2013). Ditheno [3,2-b:2',3'-d]phospholes: A Look Back at the First Decade. SynLett. 24, 920-937).

With respect to Formulae IA, IB, IC, IAA, IBB, ICC and ID, if $R^1$ to $R^{16}$ is bonded to N, any one of $R^1$ to $R^{16}$ can optionally, be a pair of electrons. In this instance, the N in the ring may be substituted by reacting the final product, Formula I, with $R^{19}$—X, wherein X is any group that can provide any suitable counterion once reacted with Formula I to yield a salt thereof. In some embodiments, X is selected from halides (e.g., F, Cl, Br, I) $NO_3$, $ClO_4$, OH, $H_2PO_4$, $HSO_4$, $BF_4$, $PF_6$, sulfonate groups (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), or carboxylate groups (e.g., acetate, ethanoate, propanoate, benzoate, glycerate, lactate, tartrate, glycolate, and the like). In more specific embodiments, X is selected from Br, $SO_3CF_3$, $BF_4$, or $PF_6$. The $R^{19}$ group can be any suitable group that can react with the neutral compound of Formula I and, more specifically react at the N atom(s) on the ring(s), such that the $R^{19}$ bonds to the N atom to yield a salt. The $R^{19}$ group can be similar to those outlined above with respect to the options provided for $R^1$ to $R^{16}$.

In an embodiment, the compound of Formula IC, Formula ICC, and/or Formula ID are oxidized such that at least one of X, and $Y_1$ are O. In other embodiments, the compound of Formula IC, Formula ICC, and/or Formula ID are sulfidized such that at least one of $X_1$ and Y, are S. In another embodiment, the compound of Formula IC, Formula ICC, and/or Formula ID are alkylated such that at least one of $X_1$ and $Y_1$ are a substituted or unsubstituted alkyl group. In a further embodiment, the compound of Formula IC, Formula ICC, and/or Formula ID undergo a boration reaction such that at least one of $X_1$ and $Y_1$ are $BR_1R_2R_3$. In a further embodiment, the product is Formula IC', ICC' or ID':

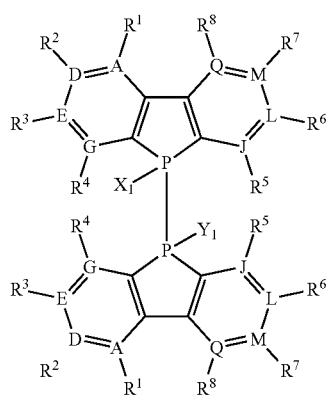

Formula IC'

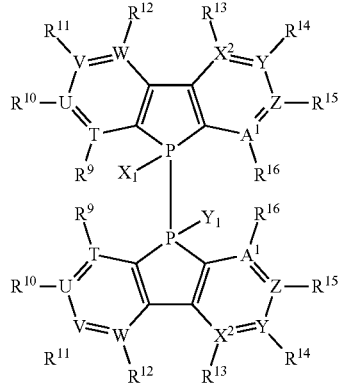

Formula ICC'

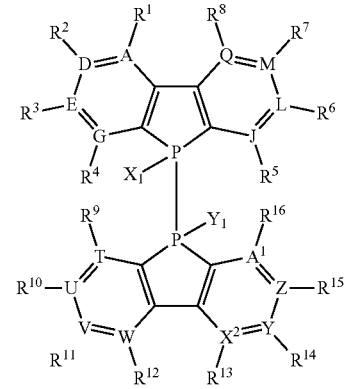

Formula ID' and at least one of the products of Formula IC', ICC' or ID' is reacted with $R^{19}$—X, wherein at least one of A, D, E, G, J, L, M, Q, T, U, V, W, $X^2$, Y, Z, and $A_1$ is N and reacts with $R^{19}$—X such that $R^{19}$ bonds to the N and X becomes $X^-$ and $R^{19}$ is independently selected from the same options as $R^1$ to $R^{16}$.

In another embodiment, the compound of Formula IC, Formula ICC, and/or Formula ID are reacted with $R^{19}$—X, wherein at least one of A, D, E, G, J, L, M, Q, T, U, V, W, $X^2$, Y, Z, and $A_1$ is N and reacts with $R^{19}$—X such that $R^{19}$ bonds to the N and X becomes $X^-$ and $R^{19}$ is independently selected from the same options as $R^1$ to $R^{16}$ to form a salt. In other embodiments,
the salt can be oxidized such that at least one of $X_1$ and $Y_1$ are O; the salt can be sulfidized such that at least one of $X_1$ and $Y_1$ are S; the salt is alkylated such that at least one of $X_1$ and $Y_1$ are a substituted or unsubstituted alkyl group; and/or the salt undergoes a boration reaction such that at least one of $X_1$ and $Y_1$ are $BR_1R_2R_3$.

The above disclosure generally describes the present invention. A more complete understanding can be obtained by reference to the following specific examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the typical aspects of the present invention, and are not to be construed as limiting in any way the remainder of the disclosure.

EXAMPLES

All manipulations were carried out under a dry nitrogen atmosphere employing standard Schlenk techniques. Solvents were dried using an MBraun Solvent Purification System. Unless noted otherwise, starting materials were used as received. $^{31}P(^1H)$ NMR, $^1H$ NMR and $^{13}C(^1H)$ NMR were recorded on Bruker DRX400 and Avance (II, III) 400 MHz spectrometers. Chemical shifts were referenced to external 85% $H_3PO_4$ ($^{31}P$), and external TMS ($^{13}C$, $^1H$). Theoretical calculations have been carried out at the B3LYP/6-31G(d) level by using the GAUSSIAN 09 suite of programs.

Syntheses

Example 1: Bis(dipyridophosphole)

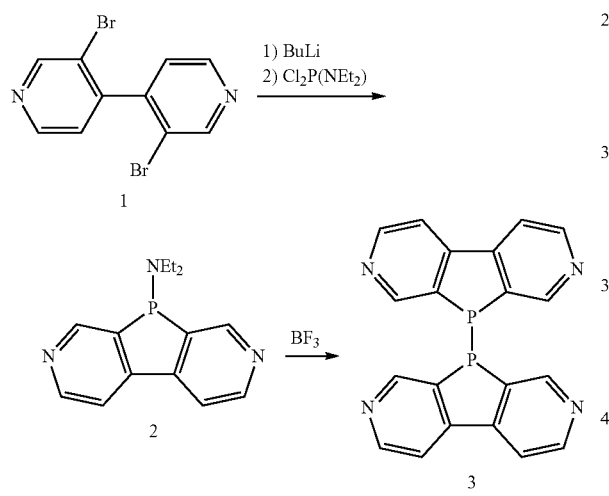

About 691 mg (about 2.2 mmol) 3,3'-Dibromo-4,4'-bipyridine (1)) (Durben S. and Baumgartner T. (2011). 3,7-Diazadibenzophosphole Oxide—A Phosphorus-Bridged Viologen-Analogue with Significantly Lowered Reduction Threshold. Angew. Chem. Int. Ed. 50, 7948-7952) was dissolved in about 100 mL tetrahydrofuran (THF) and cooled to about −94° C. (slush of acetone/liquid nitrogen). About 2.6 mL (about 4.5 mmol) n-buthyllithium (about 1.6 M in hexanes) was added slowly dropwise at about −94° C. and the solution was stirred for 1 h at about −94° C. (add liquid nitrogen every 10-15 min). About 340 mg (about 2.11 mmol) Dichloro(diethylamino)phosphine (SigmaAldrich) was dissolved in about 10 mL THF and added quickly to the reaction mixture via syringe. The reaction flask was immediately placed in about 45° C. bath (e.g. warm water) and allowed to cool to about room temperature over about 1 h, while stirring.

The solvent was removed under vacuum and the obtained black solid (2) re-suspended in dichloromethane and filtered through Celite under argon atmosphere. The solvent was reduced to about 10 mL and about 0.25 mL (about 2.00 mmol) $BF_3·Et_2O$ added to the reaction mixture. After heating to about 45° C. for about 16 h (overnight), a yellow solid precipitated (3) which was decanted, dried in vacuo and suspended in THF. An NMR sample was prepared in to obtain a $^{31}P$-NMR spectrum with a signal at −27 ppm indicating the formation of the dimer.

Examples 2-6

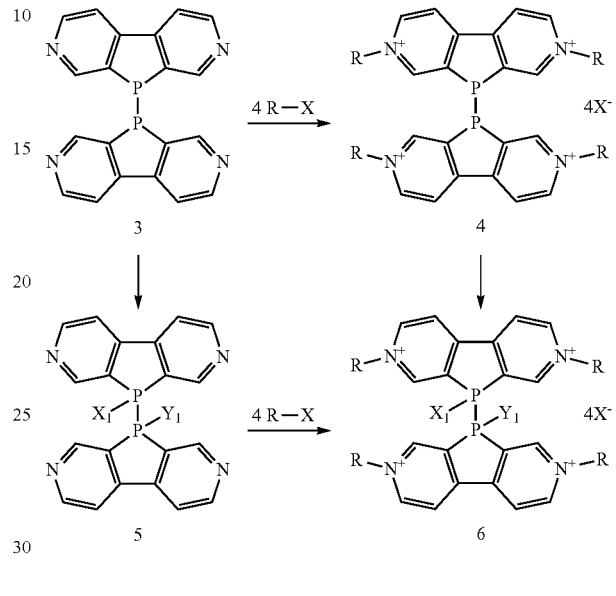

Example 2: Bis(methylphosphaviologen) ditriflate 4 (R is methyl and X is $SO_3CF_3$)

To a solution of about 370 mg (about 1 mmol) of bis(dipyridophosphole) dissolved in about 50 mL of dichloromethane, about 656 mg (about 4.4 mmol) of methyl trifluoromethylsulfonate (SigmaAldrich) is added dropwise at 0° C. The solution is allowed to come to room temperature and stirred further for about 3 h. The volatiles are removed under vacuum and the crude product is recrystallized from methanol.

Example 3: Bis(dipyridophosphole oxide) 5 ($X_1$ and $Y_1$ is O)

$(Me_3SiO)_2$ (about 400 mg, 2.2 mmol), made by reaction of hydrogen peroxide-DABCO (1,4-diazabicyclo[2.2.2]octane) complex (SigmaAldrich) with $Me_3SiCl$ (SigmaAldrich), is added to a solution of compound 3 (about 370 mg; 1 mmol) in about 50 mL dichloromethane under nitrogen. The reaction is monitored via $^{31}P$ NMR to ensure completion. When complete conversion is observed, the reaction mixture is concentrated and purified by column chromatography (acetonitrile/DMF).

Example 4: Bis(dipyridophosphole sulfide) 5 ($X_1$ and $Y_1$ is S)

Compound 3 (about 370 mg; 1 mmol) is dissolved in about 50 mL dichloromethane under nitrogen and about 1.0 g (about 2.5 mmol) of Lawesson's reagent (Alfa Aesar) is added at room temperature. The reaction mixture is stirred overnight, concentrated and purified by column chromatography (acetonitrile/DMF).

Example 5: Bis(methylphosphaviologen) dioxide ditriflate salt 6 ($X_1$ and $Y_1$ is O; R is methyl; and X is $SO_3CF_3$)

To a solution of about 402 mg (about 1 mmol) of bis(dipyridophosphole oxide) (5; E=O) dissolved in about 50 mL of acetonitrile, 656 mg (about 4.4 mmol) of methyl trifluoromethylsulfonate (SigmaAldrich) is added dropwise under nitrogen at 0° C. The solution is allowed to come to room temperature and stirred for another 3 h. The volatiles are removed under vacuum and the crude product is recrystallized from DMF.

Example 6: Bis(methylphosphaviologen) disulfide ditriflate salt 6 ($X_1$ and $Y_1$=S; R is methyl; and X is $SO_3CF_3$)

To a solution of about 1.03 g (about 1 mmol) bis(methylphosphaviologen) ditriflate 4 in 100 mL of acetonitrile is added about 1.0 g (about 2.5 mmol) of Lawesson's reagent (Alfa Aesar) under nitrogen at room temperature. The reaction mixture is stirred overnight, concentrated and purified by column chromatography (acetonitrile/DMF).

What is claimed is:

1. A compound having the structure of Formula I:

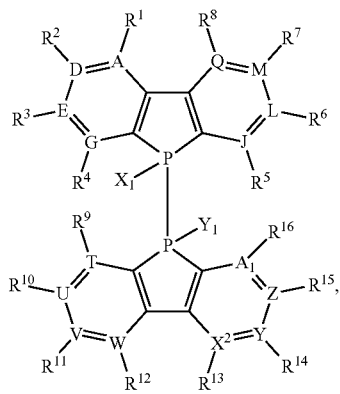

Formula I a salt, hydrate, solvate, tautomer, optical isomer, or combination thereof;
wherein:
A, D, E, G, J, L, M, Q, T, U, V, W, $X^2$, Y, Z, and $A_1$ are each independently selected from C or N;
$R^1$ to $R^{16}$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic, and when any one of $R^1$ to $R^{16}$ is bonded to N, $R^1$ to $R^{16}$ is optionally, a pair of electrons; and
$X_1$ and $Y_1$ are each independently selected from a pair of electrons, O, S, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, a substituted or unsubstituted heteroaromatic, or $BR_1R_2R_3$, wherein $R_1$ to $R_3$ are each independently selected from H, a halo group, a hydroxyl group, a substituted or unsubstituted hydrocarbon group, a substituted or unsubstituted heterogeneous group, a substituted or unsubstituted carbocyclic group, a substituted or unsubstituted heterocyclic group, substituted or unsubstituted aromatic, or a substituted or unsubstituted heteroaromatic.

2. The compound according to claim 1, wherein one or two of A, D, E, and G are N; one or two of J, L, M, and Q are N; one or two of T, U, V, and W are N; and/or one or two of, $X^2$, Y, Z, and $A_1$ are N.

3. The compound according to claim 1, wherein one of A, D, E, and G are N; one or two of J, L, M, and Q are N; one or two of T, U, V, and W are N; and/or one or two of, $X^2$, Y, Z, and $A_1$ are N.

4. The compound according to claim 1, wherein one of A, D, E, and G are N; one of J, L, M, and Q are N; one or two of T, U, V, and W are N; and/or one or two of, $X^2$, Y, Z, and $A_1$ are N.

5. The compound according to claim 1, wherein one of A, D, E, and G are N; one of J, L, M, and Q are N; one of T, U, V, and W is N; and/or one or two of, $X^2$, Y, Z, and $A_1$ are N.

6. The compound according to claim 1, wherein one of A, D, E, and G is N; one of J, L, M, and Q is N; one of T, U, V, and W is N; and/or one of, $X^2$, Y, Z, and $A_1$ is N.

7. The compound according to claim 1, wherein at least one of E, L, U, and Z is N and A, D, G, J, M, Q, T, V, W, $X^2$, Y, and $A_1$ are each C.

8. The compound according to claim 1, wherein at least one of D, M, V, and Y is N and A, E, G, J, L, Q, T, U, W, $X^2$, Z, and $A_1$ are each C.

9. The compound according to claim 1, wherein at least one of A, Q, W, and $X^2$ is N and D, E, G, J, L, M, T, U, V, Y, Z, and $A_1$ are each C.

10. The compound according to claim 1, wherein at least one of G, J, T, and $A_1$ is N and A, D, E, L, M, Q, U, V, W, $X^2$, Y, and Z are each C.

11. The compound according to claim 1, wherein $R^1$ to $R^{16}$ and $R_1$ to $R_3$ are each independently selected from H, a substituted or unsubstituted alkyl group, a substituted or unsubstituted alkenyl group, a substituted or unsubstituted aromatic group, a substituted or unsubstituted heteroaromatic group, or when $R^1$ to $R^{16}$ is bonded to N, any one of $R^1$ to $R^{16}$ is optionally, a pair of electrons.

12. The compound according to claim 1, wherein $R^1$ to $R^{16}$ and $R_1$ to $R_3$ are each independently selected from H, a substituted or unsubstituted $C_1$-$C_6$ alkyl group, substituted or unsubstituted benzyl group, a substituted or unsubstituted aryl group, or when $R^1$ to $R^{16}$ is bonded to N, any one of $R^1$ to $R^{16}$ is optionally, a pair of electrons.

13. The compound according to claim 1, wherein $R^1$ to $R^{16}$ and $R_1$ to $R_3$ are each independently selected from H, a $C_1$-$C_6$ alkyl group, a benzyl group, an aryl group, or when $R^1$ to $R^{16}$ is bonded to N, any one of $R^1$ to $R^{16}$ is optionally, a pair of electrons.

14. The compound according to claim 1, wherein one or two of $R^1$ to $R^4$ are selected from a substituted or unsubstituted $C_1$-$C_6$ alkyl group, substituted or unsubstituted benzyl group, or a substituted or unsubstituted aryl group; one or two of $R^5$ to $R^8$ are selected from a substituted or unsubstituted $C_1$-$C_6$ alkyl group, substituted or unsubstituted benzyl group, or a substituted or unsubstituted aryl group; one or two of $R^9$ to $R^{12}$ are selected from a substituted or unsubstituted $C_1$-$C_6$ alkyl group, substituted or unsubstituted benzyl group, or a substituted or unsubstituted aryl group; and/or one or two of $R^{13}$ to $R^{16}$ are selected from a substituted or unsubstituted $C_1$-$C_6$ alkyl group, substituted or unsubstituted benzyl group, or a substituted or unsubstituted aryl group; and the remaining R groups are H or an alkyl group.

15. The compound according to claim 14, wherein the alkyl group is a $C_1$-$C_6$ alkyl group.

16. The compound according to claim 14, wherein the remaining R groups are H.

17. The compound according to claim 1, wherein one of $R^1$ to $R^4$ is selected from a substituted or unsubstituted $C_1$-$C_6$ alkyl group, substituted or unsubstituted benzyl group, or a substituted or unsubstituted aryl group; one of $R^5$ to $R^8$ is selected from a substituted or unsubstituted $C_1$-$C_6$ alkyl group, substituted or unsubstituted benzyl group, or a substituted or unsubstituted aryl group; one of $R^9$ to $R^{12}$ is selected from a substituted or unsubstituted $C_1$-$C_6$ alkyl group, substituted or unsubstituted benzyl group, or a substituted or unsubstituted aryl group; and/or one of $R^{13}$ to $R^{16}$ is selected from a substituted or unsubstituted $C_1$-$C_6$ alkyl group, substituted or unsubstituted benzyl group, or a substituted or unsubstituted aryl group; and the remaining R groups are each independently selected from H or an alkyl group.

18. The compound according to claim 1, wherein $X_1$ and $Y_1$ are each independently selected from a pair of electrons, O, S, a substituted or unsubstituted hydrocarbon group, or $BR_1R_2R_3$.

19. The compound according to claim 18, wherein $X_1$ and $Y_1$ are each independently selected from a pair of electrons, O, S, a substituted or unsubstituted $C_1$-$C_6$ alkyl group, $BH_3$, or $BF_3$.

20. The compound according to claim 1, wherein $X_1$ and $Y_1$ are each independently selected from a pair of electrons, O, or S.

21. The compound according to claim 1, wherein $X_1$ and $Y_1$ are the same.

22. The compound according to claim 1, wherein the compound is selected from at least one of:

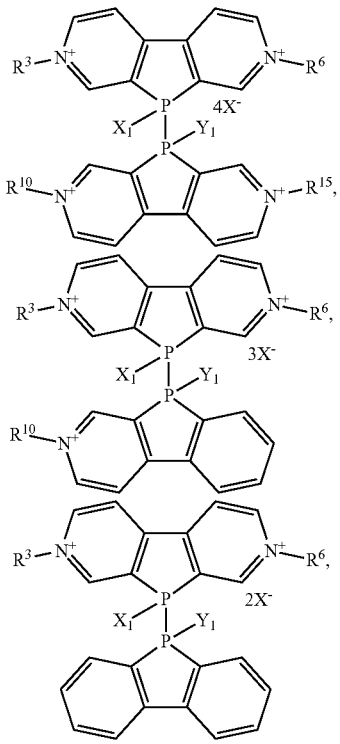

-continued

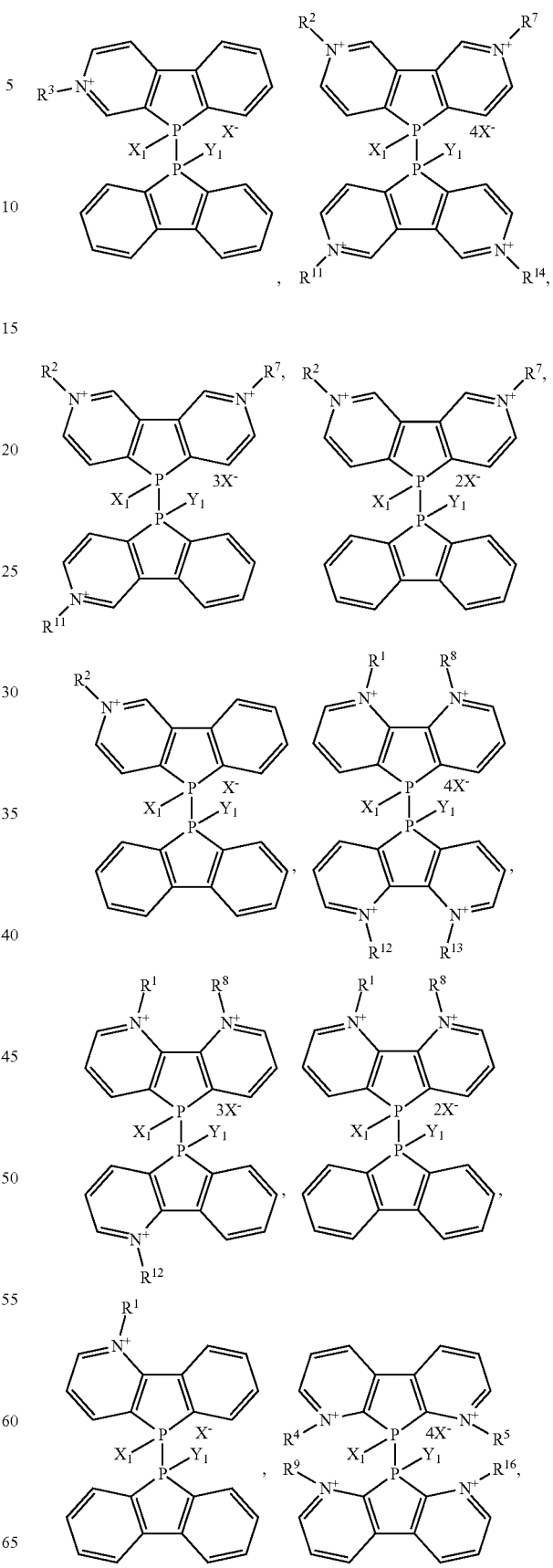

-continued
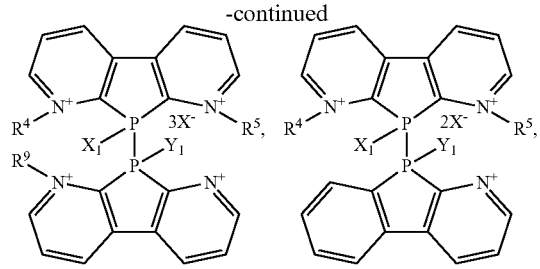
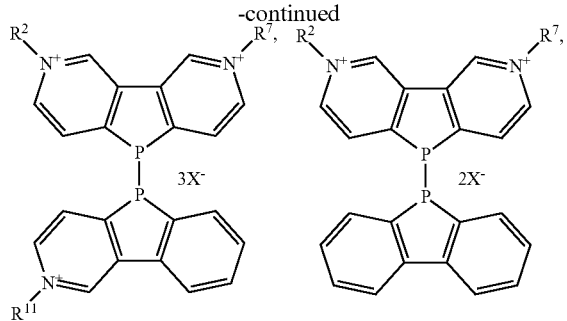
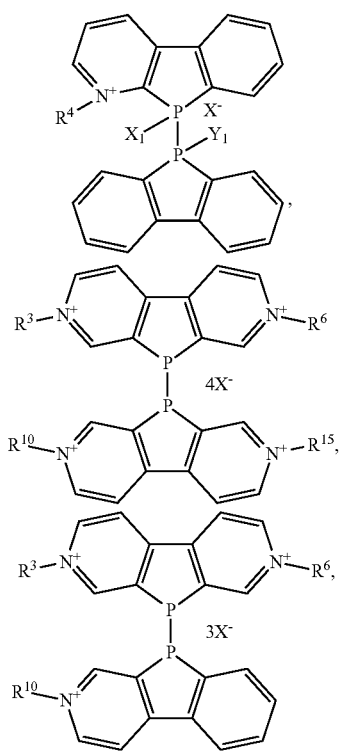
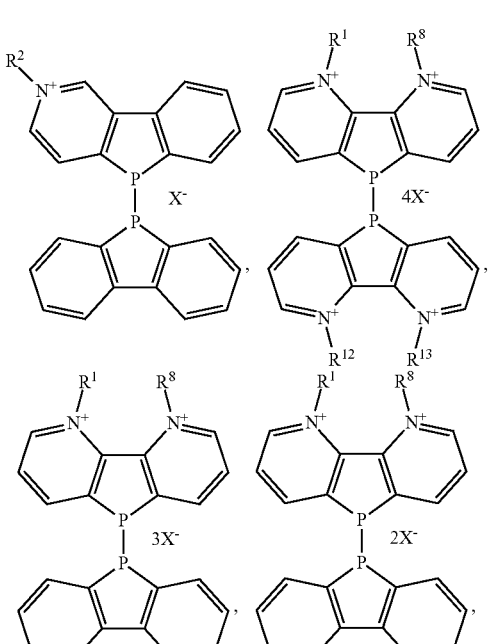
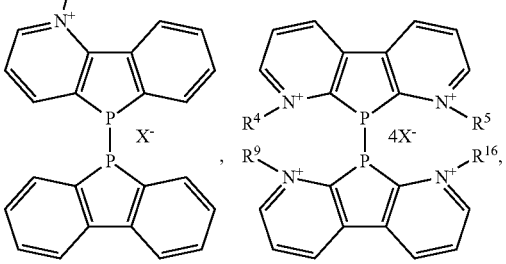
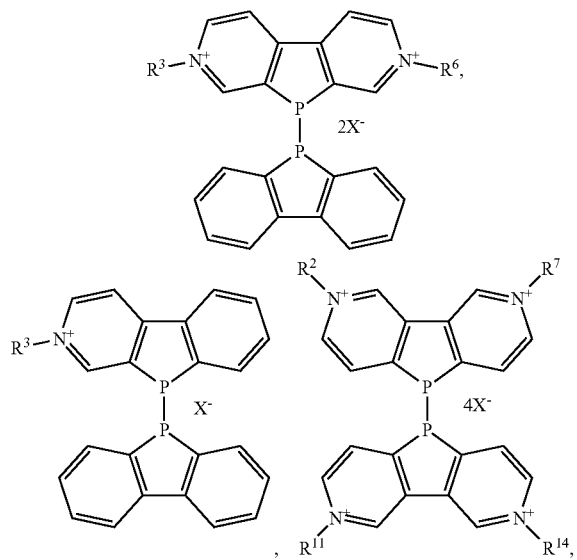
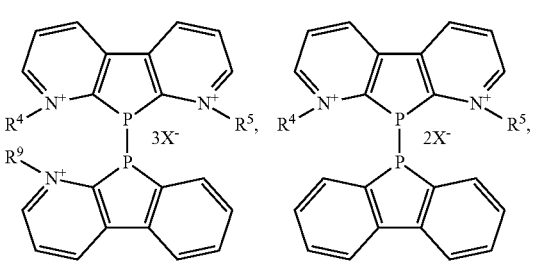

-continued

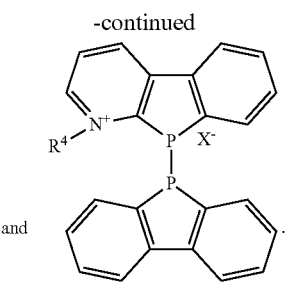

and

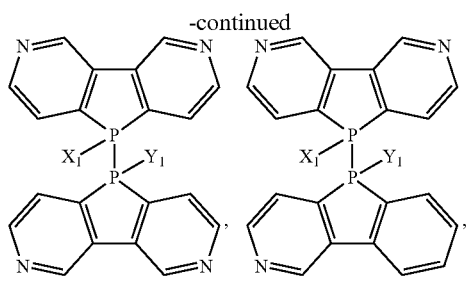

wherein X⁻ is selected from halide ions, $NO_3^-$, $ClO_4^-$, $OH^-$, $H_2PO_4^-$, $HSO_4^-$, $^-BF_4$, $^-PF_6$, sulfonate ions or carboxylate ions.

23. The compound according to claim 22, wherein X⁻ is selected from Br⁻, $^-SO_3CF_3$, $^-BF_4$, or $^-PF_6$.

24. The compound according to claim 22, wherein at least one of $R^3$, $R^6$, $R^{10}$, and $R^{15}$ is selected from a substituted or unsubstituted $C_1$-$C_6$ alkyl group, substituted or unsubstituted benzyl group, or a substituted or unsubstituted aryl group.

25. The compound according to claim 22, wherein at least one of $R^2$, $R^7$, $R^{11}$, and $R^{14}$ is selected from a substituted or unsubstituted $C_1$-$C_6$ alkyl group, substituted or unsubstituted benzyl group, or a substituted or unsubstituted aryl group.

26. The compound according to claim 22, wherein at least one of $R^1$, $R^8$, $R^{12}$, and $R^{13}$ is selected from a substituted or unsubstituted $C_1$-$C_6$ alkyl group, substituted or unsubstituted benzyl group, or a substituted or unsubstituted aryl group.

27. The compound according to claim 22, wherein at least one of $R^4$, $R^5$, $R^9$, and $R^{16}$ is selected from a substituted or unsubstituted $C_1$-$C_6$ alkyl group, substituted or unsubstituted benzyl group, or a substituted or unsubstituted aryl group.

28. The compound according to claim 22, wherein the compound is selected from at least one of:

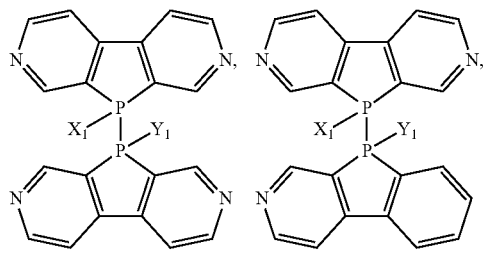

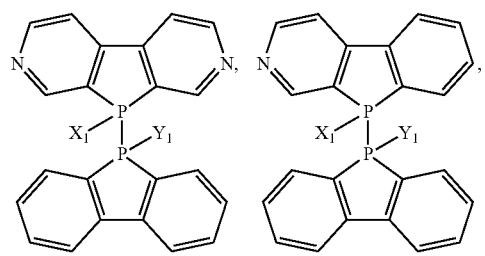

-continued

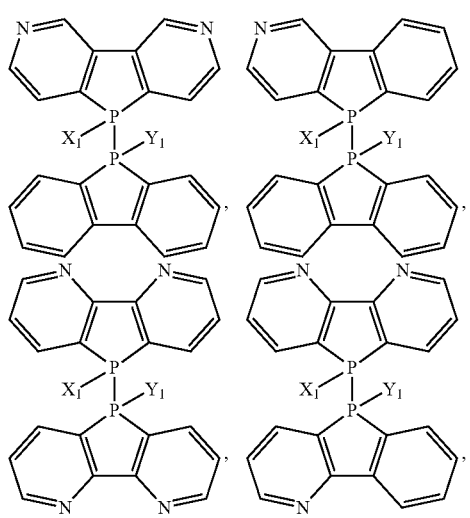

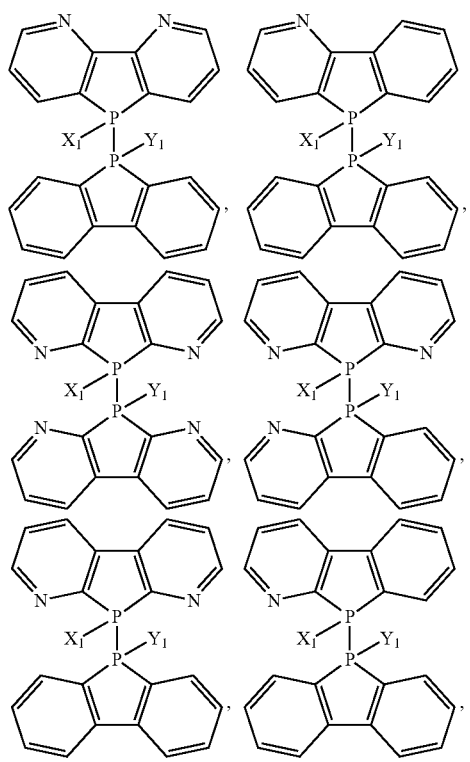

-continued

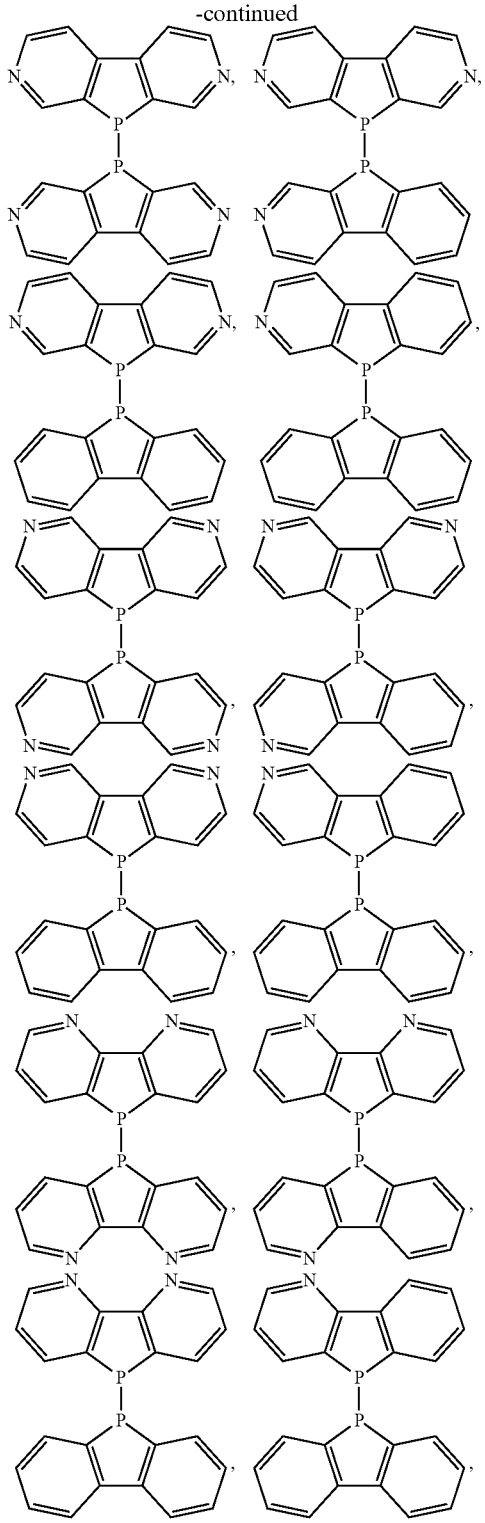

-continued

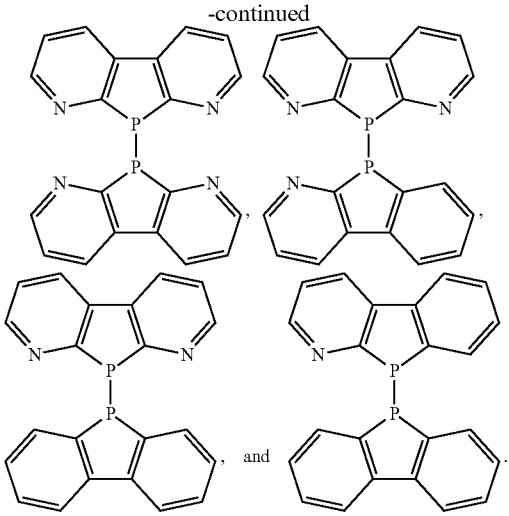

29. The compound according to claim 1, wherein the compound has a P—P σ bond angled about 70° to about 90° to conjugated phosphole planes.

30. The compound according to claim 1, wherein the compounds pack efficiently.

31. The compound according to claim 1, having up to five-color electrochromism.

32. A composition comprising at least one compound according to claim 1.

33. A redox mediator comprising at least one compound according claim 1.

34. An electrochromic device comprising at least one compound according to claim 1.

35. An electrode material comprising at least one compound according to claim 1.

36. A battery comprising at least one compound according to claim 1.

37. An electrochromic device, comprising:
   (a) at least one substantially transparent substrate having an electrically conductive material associated therewith; and
   (b) an electrochromic medium which comprises:
   (1) a solvent;
   (2) a cathodic material; and
   (3) an anodic electrochromic material comprising at least one compound of claim 1.

38. An electrochromic medium for use in an electrochromic device, comprising:
   (a) a solvent;
   (b) a cathodic material; and
   (c) an anodic electrochromic material comprising at least one compound of claim 1.

* * * * *